United States Patent [19]

Fujinami

[11] Patent Number: 5,758,011
[45] Date of Patent: May 26, 1998

[54] APPARATUS FOR REPRODUCING DATA CONTAINING TIME INFORMATION

[75] Inventor: Yasushi Fujinami, Kanagawa, Japan

[73] Assignee: Sony Corporation, Tokyo, Japan

[21] Appl. No.: 643,162

[22] Filed: May 2, 1996

Related U.S. Application Data

[62] Division of Ser. No. 321,986, Oct. 12, 1994, Pat. No. 5,668,916.

[30] Foreign Application Priority Data

Oct. 15, 1993 [JP] Japan .................. 05-257960

[51] Int. Cl.[6] .................................................. H04N 5/76
[52] U.S. Cl. .................. 386/98; 386/111; 386/91; 369/48
[58] Field of Search ............... 386/46, 111, 98, 386/62, 65, 112, 101, 47, 91; 370/112, 94.2; 369/60, 48, 47; H04N 5/76

[56] References Cited

U.S. PATENT DOCUMENTS

| | | | |
|---|---|---|---|
| 4,985,784 | 1/1991 | Tsuboi et al. | 386/126 |
| 5,291,486 | 3/1994 | Koyanagi | 370/112 |
| 5,396,497 | 3/1995 | Veltman | 370/112 |
| 5,432,769 | 7/1995 | Honjo | 369/60 |
| 5,463,607 | 10/1995 | Roth et al. | 369/60 |
| 5,471,450 | 11/1995 | Yonemitsu et al. | 369/60 |
| 5,481,543 | 1/1996 | Veltman | 370/112 |
| 5,510,906 | 4/1996 | Yagasaki et al. | 386/126 |

FOREIGN PATENT DOCUMENTS

| | | |
|---|---|---|
| 0 245 904 | 11/1987 | European Pat. Off. . |
| 0 377 340 | 7/1990 | European Pat. Off. . |
| 0 460 751 | 12/1991 | European Pat. Off. . |
| 0 522 853 | 1/1993 | European Pat. Off. . |
| 0 590 881 | 4/1994 | European Pat. Off. . |

OTHER PUBLICATIONS

Signal Processing. Image Communication, vol. 4, No. 2, Apr. 1992, Amsterdam NL pp. 153-159 A. Macinnis 'The MPEG systems coding specification'.

International Standards Organisation, 20 Apr. 1992, Tokyo, JP; ISO/IEC JTC1/SC29/WG11: 'Coding of moving pictures and associated audio for digital storage media at up to about 1.5 Mbits/s, Part 1, Systems'.

Sandbank C.P. 'Digital Television'1990, Wiley & Sons pp. 625-628.

*Primary Examiner*—Thai Tran
*Assistant Examiner*—Huy Nguyen
*Attorney, Agent, or Firm*—Frommer Lawrence & Haug LLP; William S. Frommer

[57] ABSTRACT

A data reproducing apparatus having a reproducing device for reproducing data stored on a recording medium, a first storing device for storing data reproduced from the record medium and a decode device for decoding data read out from the first storing device. The reproducing apparatus further having a second storing device for storing a data writing position of the first storing device when a reproduction point of data from the recording medium of the reproducing device is discontinuously shifted, and a read-out controller for controlling the read-out of the data from the first storing device in correspondence with the data writing position stored in the second storing device.

18 Claims, 39 Drawing Sheets

5,758,011

1

APPARATUS FOR REPRODUCING DATA CONTAINING TIME INFORMATION

This application is a division of application Ser. No. 08/321,986, filed Oct. 12, 1994 U.S. Pat. No. 5,668,916.

BACKGROUND OF THE INVENTION

1. Field of the Invention

This invention relates to an improvement of a data reproducing device which was previously filed by the applicant of this invention in U.S. Patent Office on Dec. 14, 1993, and is disclosed in U.S. patent application Ser. No. 08/165,885, and more particularly to a data reproducing device which is suitably used to reproduce both of video data and audio data recorded on an optical disc in a time division multiplexing (TDM) mode while separating and decoding these data.

2. Description of Related Art

FIG. 1 is a block diagram showing the data reproducing device which is disclosed in U.S. patent application Ser. No. 08/165,885 (FIG. 6).

The data reproducing device has a disc driver 1 for reproducing data from an optical disc, on which video data and audio data are recorded in a time division multiplexing (TDM) mode, a decoding unit 2 to which reproduction data output from the driver 1 is supplied to decode the input data, and an ECC circuit 3 for receiving data output from the decoding unit 2 to detect and correct errors of the data. The output of the ECC circuit 3 is supplied to each of a ring buffer 4 and an address extracting circuit 31. The ring buffer 4 serves to accumulate a predetermined amount of data input thereto, and then output the accumulated data to a multiplexed data separating unit 5.

The multiplexed data separating unit 5 has a data separation circuit 21 for separating each of video data, audio data, an SCR (system clock reference), a DTS (decoding time stamp) for video data (hereinafter referred to as "DTSV"), and a DTS for audio data (hereinafter referred to as "DTSA") from data supplied from the ring buffer 4.

A data format for the data to be supplied to multiplexed data separation unit 5 is defined as shown in FIG. 2, for example. The format is defined as a multiplexed bit stream of MPEG (ISO11172). As shown in FIG. 2, the multiplexed bit stream comprises one or more packs (PACK), and each pack comprises one or more packet (PACKET). At the head of the pack is disposed a pack header (PACK HEADER), and at the packheader are disposed a pack start code (PACK START CODE) representing a start point of the pack, SCR and MUX RATE. The SCR represents a time when its final byte is input to the multiplexed data separation unit 5 (a time when a demultiplexing operation is started). The MUX RATE represents a transmission rate.

In an embodiment shown in FIG. 2, a video packet (VIDEO PACKET) and an audio packet (AUDIO PACKET) are successively disposed subsequently to the pack header. A packet header (PACKET HEADER) is disposed at the head of each of these video and audio packets, and the packet header has a video packet start code (VIDEO PACKET START CODE) or audio packet start code (AUDIO PACKET START CODE) representing a start point of the video or audio packet, and a DTSV or DTSA representing a start time of a decoding operation of the video or audio data. The video data (VIDEO DATA) or audio data (AUDIO DATA) are disposed subsequently to each packet header.

The timing data (time information) such as SCR, DTS (DTSV or DTSA) are represented with a count value of 90 kHz frequency clocks, and have 33-bit significant digit.

2

The video data which are separated in the data separation circuit 21 are supplied to a video code buffer 6 (FIFO), and the audio data are supplied to an audio code buffer 8 (FIFO). The SCR is supplied to and stored in an STC register 26. The STC register 26 serves to count clocks of 90 kHz frequency output from a clock generating circuit 27 and increment its storage value to generate an STC (system time clock).

The DTSV and DTSA which are separated by the data separation circuit 21 are supplied to and stored in a DTSV register 22 and a DTSA register 24 respectively. The data stored in the DTSV register 22 and the DTSA register 24 are supplied to comparators 23 and 25 respectively, and these data are compared with the STC output from the STC register 26.

The data reproducing device shown in FIG. 1 also has a control circuit 28 which comprises a CPU or the like and controls a reproducing operation on the basis of an instruction which is input in correspondence with an user's manipulation of an input unit 29, and an address storing circuit 30 for storing a reproduction start address and a reproduction end address which are input through the input unit 29.

The video data stored in the video code buffer 6 are read out and supplied to a video decoder 7, and decoded by the video decoder 7 to generate video signals. The generated video signals are output to a circuit (not shown). The video decoder 7 is supplied with a video decode start signal output from the comparator 23.

Likewise, the data output from the audio code buffer 8 are supplied to an audio decoder 9, and decoded therein. The audio decoder 9 is also supplied with an audio decode start signal output from the comparator 25.

Next, the operation of the data reproducing device as described above will be described with reference to FIG. 3. First, through manipulation of the input unit 29, a reproduction start address, a reproduction end address and a reproduction start are instructed to the control circuit 28. The reproduction start address and the reproduction end address are stored in the address storing circuit 30. At this time, the control circuit 28 outputs an instruction to the driver 1 to reproduce data recorded on an optical disc which is mounted in the driver 1. The reproduction data output from the driver 1 are supplied to the decoding unit 2 and decoded therein, and then supplied to the ECC circuit 3 in which the data are subjected to an error detection and correction processing.

The data which have been subjected to the error detection and correction processing in the ECC circuit 3 are supplied to the address extraction circuit 31 to read out an address disposed at a predetermined position in the data. The read-out address is supplied to the control circuit 28. The control circuit 28 is on standby until the read-out address supplied thereto is coincident with the reproduction start address from the address storing circuit 30, and if both of the addresses are coincident with each other, the control circuit 28 generates and outputs an accumulation start command to the ring buffer 4. Through this operation, the reproduction data output from the driver 1 are accumulated in the ring buffer 4. Thereafter, the data stored in the ring buffer 4 are read out from the ring buffer 4, and supplied to the data separation circuit 21 of the multiplexed data separation unit 5.

The data separation circuit 21 is controlled by the control circuit 28 to separate the video data and the audio data from the data supplied from the ring buffer 4. These video data and audio data are supplied to the video code buffer 6 and the audio code buffer 8, respectively. In addition, the data separation circuit 21 separates the SCR, the DTSV and the DTSA from the data, and supplied to and stored in the STC register 26, the DTSV register 22 and the DTSA register 24, respectively.

The STC register 26 stores the SCR, and subsequently it counts the clocks output from the clock generating circuit 27 to increment its storage value (SCR) in response to each clock. The storage value of the STC register 26 is supplied to the comparators 23 and 25 as an inner time (STC).

The DTSV register 22 keeps a DTSV which is first supplied thereto after the reproduction is started by the driver 1. This DTSV corresponds to a decode start time of the data of a picture at the head of the video data which are separated by the data separation circuit 21 and supplied to and stored in the video code buffer 6.

Likewise, the DTSA register 24 keeps a DTSA which is first supplied thereto after the reproduction is started. This DTSA corresponds to a decode start time of the data of a decode unit at the head of the audio data which are stored in the audio code buffer 8.

The SCR corresponds to a time when the data are supplied from the ring buffer 4 to the multiplexed data separation unit 5 and the demultiplexing operation is started (a time at the input time point of the input data). That is, it corresponds to a time t1 in FIG. 3. The STC register 26 serves to input a time data (current time) from the time t1 to one inputs of the comparators 23 and 25.

The DTSV register 22 supplies the other input of the comparator 23 with the time DTSV when the video decoder 7 starts its decoding operation. The comparator 23 outputs the video decode start signal to the video decoder 7 when the current time (STC) output from the STC register 26 is coincident with the decode start time output from the DTSV register 22 (time t2 in FIG. 3). The video decoder 7 reads out one frame of video data which have been written in the video code buffer 6 when supplied with the video decode start signal, and starts its decoding operation.

In FIG. 3, a straight line A represents a writing state of data into the video code buffer 6 (its slope represents a write-in transfer rate), and a polygonal line B represents a read-out state of data from the video code buffer 6 by the video decoder 7. Accordingly, data remains in an area represented by a shadow in the video code buffer 6. The storage capacity of the video code buffer 6 is represented by the distance in a vertical direction between lines A and C.

Upon input of the video code start signal, the video decoder 7 starts its decode operation to generate a video vertical synchronizing signal at the time when the decoding operation is completed, that is, at the time when a video decode delay time (VIDEO DECODE DELAY) elapses after the start of the decode operation, and output video signals subsequently to this generation. Accordingly, a display is started when the video decode delay time elapses after the start of the decoding operation.

Likewise, the comparator 25 outputs the audio decode start signal when the current time (STC) output from the STC register 26 is coincident with the decode start time (DTSA) of the audio data output from the DTSA register 24. When the audio decode start signal is input, the audio decoder 9 reads out from the audio code buffer 8 data whose amount corresponds to a decode unit and starts its decode processing to generate audio signals, and outputs the generated audio signals to a circuit (not shown).

During the reproducing operation of the driver 1, addresses being read out are supplied from the address extraction circuit 31 to the control circuit 28 at all times. The control circuit 28 compares the address of data being read out and supplied thereto with the reproduction end address stored in the address storing circuit 30, and if both addresses are coincident with each other, it ends the read-out operation from the driver 1.

Since the data remain in the ring buffer 4 and the code buffers 6 and 8, the actual end time of the reproducing operation is the time when there exists no data to be input to the video decoder 7 and the audio decoder 9. In this case, the control circuit 28 finishes the reproducing operation when detecting the absence of the data to be input to the video decoder 7 and the audio decoder 9.

Now, it is considered to continuously reproduce any discontinuous two points on an optical disc having video signals recorded thereon while compressed in the MPEG system. In other words, an edition of the reproducing operation is now considered.

FIG. 4 is a timing chart for a continuous reproducing operation of a predetermined range of data on the optical disc. Here, sectioning points for an edition are represented by G, H and I, and pictures before and after the sectioning points G, H and I are represented by (a,b), (c,d) and (e, f), respectively.

In FIG. 4, a straight line D represents a write-in state of data into the video code buffer 6, and its slope represents a write-in transfer rate. A polygonal line E represents a data read-out state from the video code buffer 6 by the video decoder 7. Accordingly, data remain in an area represented by a shadow in the video code buffer 6, the storage capacity of the video code buffer 6 is represented by the distance in a vertical direction between the lines D and F.

It is now assumed that the reproduction point is jumped from the point G to the point H in FIG. 4. If a continuous reproduction is performed with no jumping operation, a picture b is reproduced subsequently to a picture a. However, if the jumping operation is performed, a picture d is reproduced subsequently to the picture a. Assuming a time required for the jump from the point G to the point H to be zero, the write-in and read-out operations of the data of the video code buffer 6 when the jumping operation as described above is performed are carried out as shown in FIG. 5.

That is, when no jumping operation is performed, at the point G, the write-in operation of the picture b and subsequent pictures are performed for the video code buffer 6 at a time t11, and this write-in operation is continued until a time t12. At the time t12, the data of the picture b is read out from the video code buffer 6, and supplied to the video decoder 7 to decode the data. The read-out of the data of the picture b at the time t12 is started after a time corresponding to one frame elapses from the read-out of the data of the picture a just before the picture b. The time period Tb between the time t11 and the time t12 is a start up delay of the picture b, and it corresponds to a time from the input of the data of the picture into the video code buffer 6 till the decoding of the data. In the MPEG system, an image compression processing is performed in accordance with complication of an image of each picture, so that a data amount becomes larger as an image is complicated while the data amount becomes smaller as an image is simple. Therefore, a different start up delay is basically adopted every picture in the MPEG system.

In the above case, the start up delay Tb of the picture b to be reproduced subsequently to the picture a when no jump is performed at the point G becomes smaller than the start up delay Td of the picture d to be reproduced subsequently to the picture a through the jumping operation from the point G to the point H.

Accordingly, as shown in FIG. 5, just before the jump is performed at the point G, the video decoder 7 is about to read out and decode the data of the next picture b from the video code buffer 6 at the timing when the data of the picture a written in the video code buffer 6 is decoded and a time corresponding to one frame elapses from the above decoding. However, in this case, since the jump is performed, the write-in operation of the data of the picture d into the video code buffer 6 is started at the time t11. Therefore, when the video decoder 7 is about to read out and decode the data of a next picture at the time t12 when the start up delay Tb of the picture b elapses from the time t11, one frame data of the picture d has not yet been written in the video code buffer 6 because the start up delay Td of the picture d is larger than the start up delay Tb of the picture b. Consequently, if the video decoder 7 reads out one frame data from the video code buffer 6, the video code buffer 6 falls into an underflow state.

On the other hand, in a case where the jump is performed from the point H to the point I in FIG. 4, the start up delay Td of the picture d to be reproduced subsequently to a picture c when no jump is performed at the point H becomes larger than the start up delay Tf of a picture f to be reproduced subsequently to the picture c through the jump operation from the point H to the point I. Consequently, the operation of the video decoder 7 when the jump is performed from the point H to the point I is performed as shown in FIG. 6 on the assumption that the time required for the jump operation is equal to zero as described above.

In this case, through the jump from the point H to the point I at a time t13, the write-in operation of the data of the picture f into the video code buffer 6 is started at the time t13. However, the start up delay Tf of the picture f is smaller than the start up delay Td of the picture d which would be reproduced if no jump is performed at the point H, so that the data of the picture f will have been stored in the video code buffer 6 for a time longer than the original start up delay Tf of the picture f.

That is, the video decoder 7 cannot start the decoding of the data of the picture f from the time when it reads out the data of the picture c until a time t32 when a time corresponding to one frame elapses from the above read-out time (this time corresponds to the end time of the start up delay Td of the picture d). As a result, the decode timing for data which contain the picture f data and subsequent picture data (read-out timing from the video code buffer 6) is delayed by the difference between the start up delay Td of the picture d and the start up delay Tf of the picture f (Td−Tf). Therefore, as shown in FIG. 6, the picture f data and the subsequent data are accumulated, and the video code buffer may fall into an overflow state.

In order to prevent the underflow as described above, the decode timing of the video decoder 7 must be delayed from the time t12 in FIG. 5. Likewise, in order to prevent the overflow, the write-in of the data into the video code buffer 6 from the point I when the jump is performed at the point H is required to be delayed by the difference (Td−Tf) of the start up delays of the pictures d and f.

However, the device shown in FIG. 1 has no element for adjusting the start up delay before and after an edition point. Therefore, when an editing operation is instructed, the overall reproducing operation is temporarily stopped at the reproduction point at which the jump is instructed. Thereafter, the reproducing operation is re-started at a jumped reproduction point.

As a result, for example when the jump is performed from the point G to the point H, the overall reproducing operation of the driver 1 is temporarily stopped at the point G (time t11) as shown in FIG. 8. However, since the data of the picture a has been already written in the video code buffer 6, the video decoder 7 reads out the data of the picture a at a time t41 to decode and output the data. After the decode processing of the data of the picture a is completed, the control circuit 28 controls the driver 1 again to restart the reproducing operation from the point H (time t42). Through this operation, at a time t43 when the start up delay Td of the picture d elapses from the time t42, the data are read out from the video code buffer 6, and then decoded in the video decoder 7.

In a case where the jump is performed from the point H to the point I, the overall reproducing operation of the driver 1 is temporarily stopped at the time t13 (when arriving at the point H) as shown in FIG. 9. Thereafter, the data which have been already written in the video code buffer 6 are decoded in the video decoder 7. The decode processing is completed at a time t51.

As described above, when the decoding operation of the data which have been already stored in the video code buffer 6 is completed, the driver 1 is controlled again, and the reproduction is started from the point I at the time t52 to write the data in the video code buffer 6. Thereafter, at the time t53 when the start up delay Tf of the picture f elapses from the time t52, the decode of the picture f is started.

In the device shown in FIG. 1, when the reproduction point is discontinuously shifted as described above, the reproducing operation is temporarily finished at a predetermined reproduction point, and then the reproducing operation is restarted from a shifted reproduction point. Therefore, there exits a problem of a data lack time of reproduction data, that is, a time in which the reproduction data are lacking (the period from the time t41 till the time t43 in FIG. 8 or the period from the time t51 till the time t53 in FIG. 9).

OBJECT AND SUMMARY OF THE INVENTION

An object of the present invention is to provide a data reproducing device in which a data lack time of reproduction data can be shortened even when the reproduction point is discontinuously shifted.

According to one aspect of the present invention, a data reproducing device comprises reproducing means for reproducing data stored on a recording medium (for example, a driver 1 shown in FIG. 10), first storing means for storing data reproduced from the recording medium (for example, a ring buffer 4 shown in FIG. 10), decode means for decoding data read out from the first storing means (for example, a video decoder 7 shown in FIG. 10), second storing means for storing a data writing position of the first storing means when a reproduction point of data from the recording medium of the reproducing means is discontinuously shifted (for example, a discontinuous point storing circuit 50 in FIG. 10, a step S8 of a program shown in FIG. 2), and a read-out control means for controlling the read-out of the data from the first storing means in correspondence with the data writing position stored in the second storing means (for example, steps S12 and S13 on a program shown in FIG. 12).

The data reproducing device may further comprise write-in control means for stopping the write-in operation of data into the first storing means when the reproduction point of the data from the recording medium of the reproducing means is discontinuously shifted, and restarting the write-in operation of the data into the first storing means when the reproduction point of the data reaches a shift target position (for example, steps S10, S11 on the program of FIG. 11).

The read-out control means may be controlled to stop its data read out from the first storing means when the read-out position of the data from the first storing means reaches the position corresponding to the data writing position stored in the second storing means.

Further, the read-out control means may be controlled to restart the data read-out operation from the first storing means when data which have been already supplied to the decode means is completed after the read-out of the data from the first storing means is stopped.

According to another aspect of the present invention, a data reproducing device comprises reproducing means for reproducing data stored on a recording medium (for example, a driver 1 shown in FIG. 15), first storing means for storing data reproduced from the recording medium (for example, a video code buffer 6 shown in FIG. 15), decode means for decoding data read out from the first storing means (for example, a video decoder 7 shown in FIG. 15), second storing means for storing a data writing position of the first storing means when a reproduction point of data from the recording medium of the reproducing means is discontinuously shifted (for example, a discontinuous point storing circuit 50 in FIG. 15, a step S43 of a program shown in FIG. 17), and a control means for controlling the decode operation of the data by the decode means in correspondence with the data writing position stored in the second storing means (for example, steps S44 and S45 on a program shown in FIG. 17 and step S201 on a program shown in FIG. 32).

The data reproducing device as described above may further comprise data amount control means for controlling a data storage amount of the first storing means in correspondence with the data writing position stored in the second storing means (for example, steps S44 and S45 on the program shown in FIG. 17).

The data reproducing device as described above may further comprise, at a front stage of the first storing means, third storing means for storing the data reproduced from the recording medium (for example, a ring buffer 4 shown in FIG. 15) and separation means for separating the data read out from the third storing means into plural data and supplying these data to the first storing means (for example, a multiplexed data separation unit 5 shown in FIG. 15).

The second storing means may be stored with a data writing position of the third storing means when the reproduction point of the data from the storing medium of the reproducing means is discontinuously shifted.

Further, the second storing means may be stored with a data writing position of the third storing means when the reproduction of the data from the recording medium of the reproducing means is discontinuously shifted, and also stored with a writing position of the first storing means when the read-out position of the data from the third storing means reaches the position corresponding to the writing position of the third storing means which is stored in the second storing means.

Further, the data reproducing device as described above may further comprise write-in control means for stopping the write-in of the data into the third storing means when the reproduction point of the data from the recording medium of the reproducing means is discontinuously shifted, and restarting the write-in of the data into the third storing means when the reproduction point of the data reaches a shift target position (for example, steps S37 and S41 on the program shown in FIG. 16). Still further, according to another aspect of the present invention, a data reproducing device comprises reproducing means for reproducing data containing time information (DTSV, for example) stored on a recording medium (for example, a driver 1 of FIG. 18), first storing means for storing data reproduced from the recording medium (for example, a video code buffer 6 of FIG. 18), decode means for decoding data read out from the first storing means (for example, a video decoder 7 of FIG. 18), time detecting means for detecting the time information from the data reproduced from the recording medium (for example, a DTSV extracting circuit 51 in FIG. 18, step S73 on a program of FIG. 20), and decode control means for controlling the decode operation of the decode means in correspondence with the time information detected by the time detection means (for example, steps S74 and S75 on the program of FIG. 20, and step S201 on the program of FIG. 32).

The data reproducing device as described above may further comprise data amount control means for controlling a data storage amount of the first storing means in correspondence with the time information detected by the time detecting means (for example, steps S74 and S75 on the program of FIG. 20).

The data reproducing device as described above may further comprise second storing means for storing the data reproduced from the recording medium (for example, ring buffer 4 in FIG. 18), separating means for separating the data read out from the second storing means into plural data and supplying these separated data to the first storing means (for example, multiplexed data separation unit 5 of FIG. 18), write-in control means for stopping the data write-in operation into the first storing means when the reproduction point of the data from the recording medium of the reproducing means is discontinuously shifted, and restarting the write-in operation of the data into the first storing means when the reproduction point of the data reaches a shift target position (for example, steps S67 and S71 on the program of FIG. 19), third storing means for storing the data writing position of the first storing means when the reproduction point of the data from the recording medium of the reproducing means is discontinuously shifted (for example, discontinuous point storing circuit 50 of FIG. 18, step S68 on the program of FIG. 19), and detection control means for controlling the detection of the time information by the time detection means in correspondence with the data writing position stored in the third storing means (for example step S72 on the program of FIG. 19).

According to another aspect of the present invention, a data reproducing device comprises reproducing means for reproducing data containing time information recorded on a recording medium (for example, a driver 1 in FIG. 21), first storing means for storing data reproduced from the recording medium (video code buffer 6 in FIG. 21), decode means for decoding the data read out from the first storing means (for example, video decoder 7 in FIG. 21), time detection means for detecting discontinuity of the time information (for example, DTSV extracting circuit 51 of FIG. 21, step S114 on a program of FIG. 24), and decode control means for controlling a decode operation of the decode means in accordance with a detection result of the time detection means (for example, step S201 on the program of FIG. 32).

The data reproducing device as described above may further comprise data amount control means for controlling a data storage amount of the first storing means in accordance with the detection result of the time detection means (for example, step S115 on the program of FIG. 24).

The data reproducing device as described may further comprise count means for counting the number of decode units such as pictures decoded by the decode means (for example, step S112 on the program of FIG. 24), and calculating means for calculating an expected value of the time information on the basis of the time information detected by the time detection means and the number of pictures which is counted by the count means (for example, step S113 on the program of FIG. 24).

According to another aspect of the present invention, a data reproducing device comprises reproducing means for reproducing data containing time information recorded on a recording medium (for example, a driver 1 of FIG. 26), first storing means for storing data reproduced from the recording medium (for example, video code buffer 6 of FIG. 26), decode means for decoding data read out from the first storing means (for example, video decoder 7 of FIG. 26), time detection means for detecting, of the time information, a difference between timing information and time information corresponding to a decode start time of the decode means (for example, step S142 of the program of FIG. 29), and decode control means for controlling the decode operation of the decode means in accordance with a detection result of the time detection means (for example, step S201 on the program of FIG. 32).

The data reproducing device as described above may further comprise data amount control means for controlling a data storage amount of the first storing means in accordance with the detection result of the time detection means (for example, step S143 on the program of FIG. 29).

The data reproducing device may further comprise picture detection means for detecting the kind of pictures (for example, I pictures) decoded by the decode means when the data contain video data) (for example, step S152 on the program of FIG. 30), whereby the time detection means is allowed to detect the difference between the timing information and the time information corresponding to the decode start time of the decode means when the picture detection means detects a picture whose kind is a predetermined one.

The data reproducing device as described above may further comprise count means for counting the frequency at which the time information is detected (for example, step S162 on the program of FIG. 31), whereby the time detection means is allowed to detect the difference between the timing information and the time information corresponding to the decode start time of the decode means when the count means detects the time information at only a predetermined frequency.

The time information whose frequency is counted by the count means may be set to the time information corresponding to the decode start time of the decode means.

The time detection means is allowed to detect the time information on the basis of the data stored in the first storing means.

The decode control means or the data amount control means is allowed to stop the decode operation of the decode means or inhibit the read-out of the data from the first storing means when the timing information is smaller than the time information corresponding to the decode start time.

When the data is encoded in the MPEG system, the timing information may be set to SCR, and the time information corresponding to the decode start time may be set to DTSV.

The data reproducing device as described above may further comprise, at the front stage of the first storing means, second storing means for storing data reproduced from the recording medium (for example, ring buffer 4 shown in FIG. 21), separation means for separating the data read out from the second storing means into plural data and supplying these separated data to the first storing means (for example, multiplexed data separation unit 5 of FIG. 21).

According to another aspect of the present invention, a data reproducing device comprises reproducing means for reproducing data recorded on a recording medium (for example, driver 1 shown in FIG. 26), storing means for storing data reproduced from the recording medium (for example, video code buffer 6 of FIG. 26), decode means for decoding data read out from the storing means (for example, video decoder 7 of FIG. 26), discontinuous point detection means for detecting a discontinuous point of data stored in the storing means (for example, step S142 on the program of FIG. 29), and decode control means for controlling the data decoding operation of the decode means in accordance with a detection result of the discontinuous point detection means (for example, step S201 on the program of FIG. 32).

The data reproducing device as described above may further comprise data amount control means for controlling a data storage amount of the storing means in accordance with the detection result of the discontinuous point detection means (for example, step S143 on the program of FIG. 29).

The data reproducing device as described above may further comprise data amount detection means for detecting the data storage amount of the storing means (for example, step S222 on a program of FIG. 35), and the decode means is allowed to stop the decode operation when the discontinuous point detection means detects a discontinuous point of data, and start the decode operation when the data amount detection means detects a predetermined amount of data.

According to another aspect of the present invention, a data reproducing device as described above comprises reproducing means for reproducing data recorded on a recording medium (for example, driver 1 of FIG. 36), first storing means for storing data reproduced from the recording medium (ring buffer 4 of FIG. 36), separation means for separating data read out from the first storing means into plural data (for example, multiplexed data separation unit 5 of FIG. 36), second storing means for storing data separated by the separation means (for example, video code buffer 6 of FIG. 36), decode means for decoding data read out from the second storing means (for example, video decoder 7 of FIG. 36), detection means for detecting a data storage amount of the second storing means (for example, step S261 on a program of FIG. 41), and data amount control means for controlling the data storage amount of the second storing means in correspondence with the data amount detected by the detection means (for example, steps S263 and S267 on the program of FIG. 41).

The data amount control means is allowed to stop the decode operation of the decode means when the detection means detects underflow of the second storing means, and to stop the data supply to the second storing means when the detection means detects overflow of the second storing means. Alternately, the data amount control means is allowed to stop the decode operation of the decode means when the detection means detects the underflow of the second storing means, and to skip data to be decoded by the decode means.

DETAILED DESCRIPTION OF PREFERRED EMBODIMENTS

Preferred embodiments according to this invention will be described with reference to the accompanying drawings.

Figure 1:
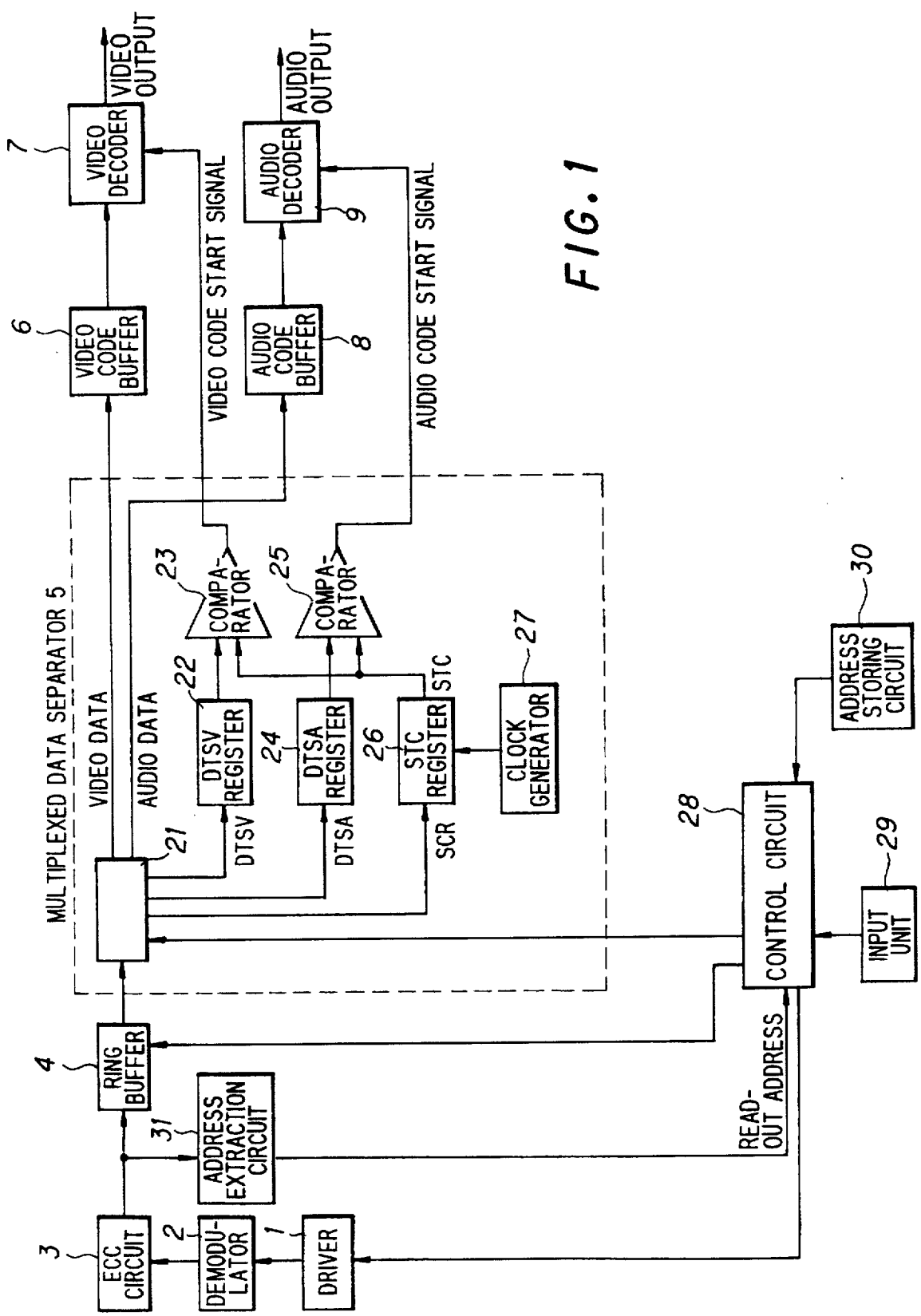
FIG. 1 is a block diagram showing the construction of a data reproducing device which is a related art of this invention.
Figure 10:
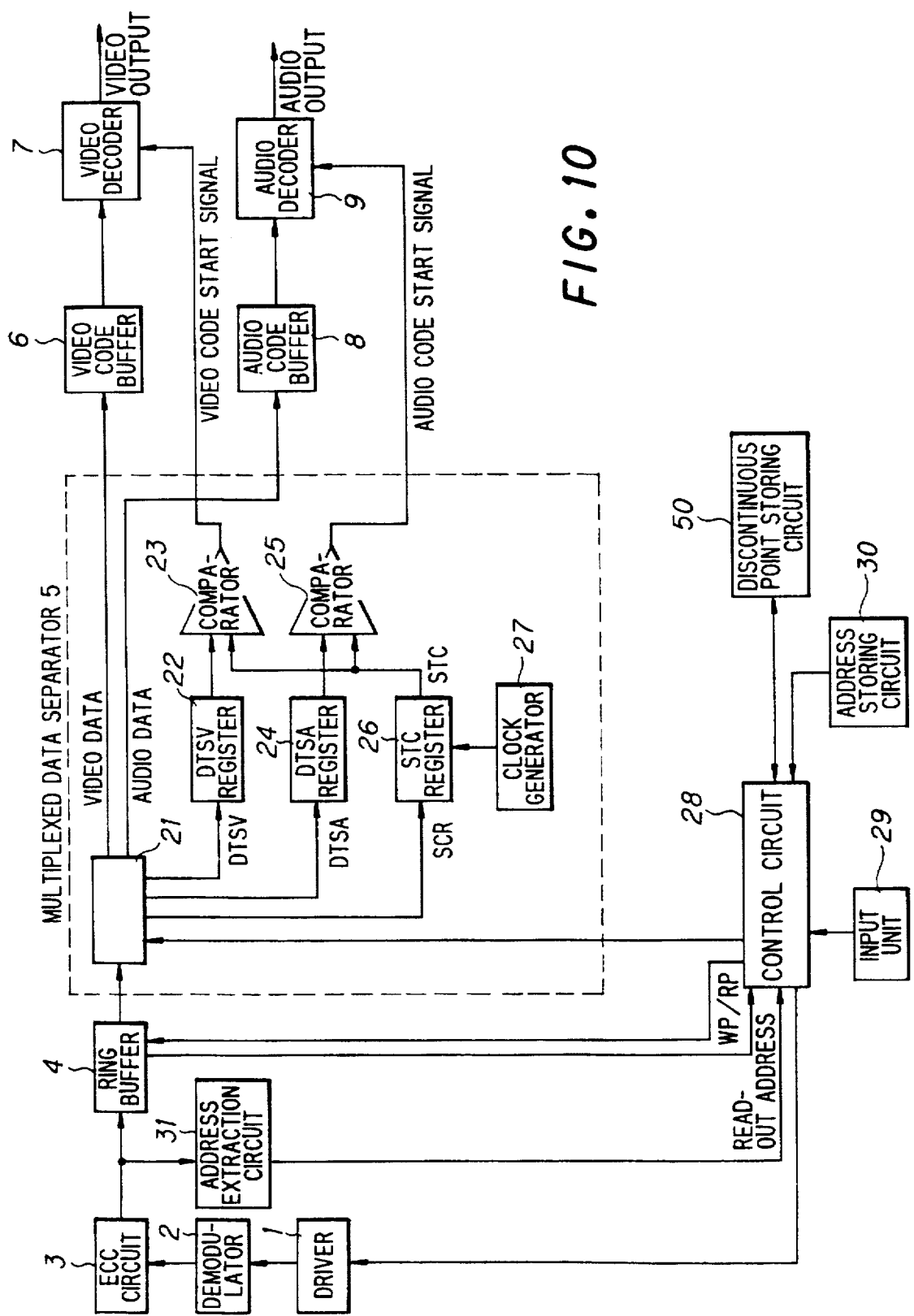
FIG. 10 is a block diagram showing an embodiment of a data reproducing device according to this invention.

FIG. 10 is a block diagram showing am first embodiment of a data reproducing device according to this invention. The elements corresponding to those of FIG. 1 are represented by the same reference numerals.

In this embodiment, a discontinuous point storing circuit 50 is connected to a control circuit 28. The discontinuous point storing circuit 50 comprises a RAM or the like, and it may be also used as an address storing circuit 30 by discriminating the addresses for storage of data from one another if occasion demands. The other construction of the device of FIG. 10 are identical to that of the device shown in FIG. 1.

Figure 11:
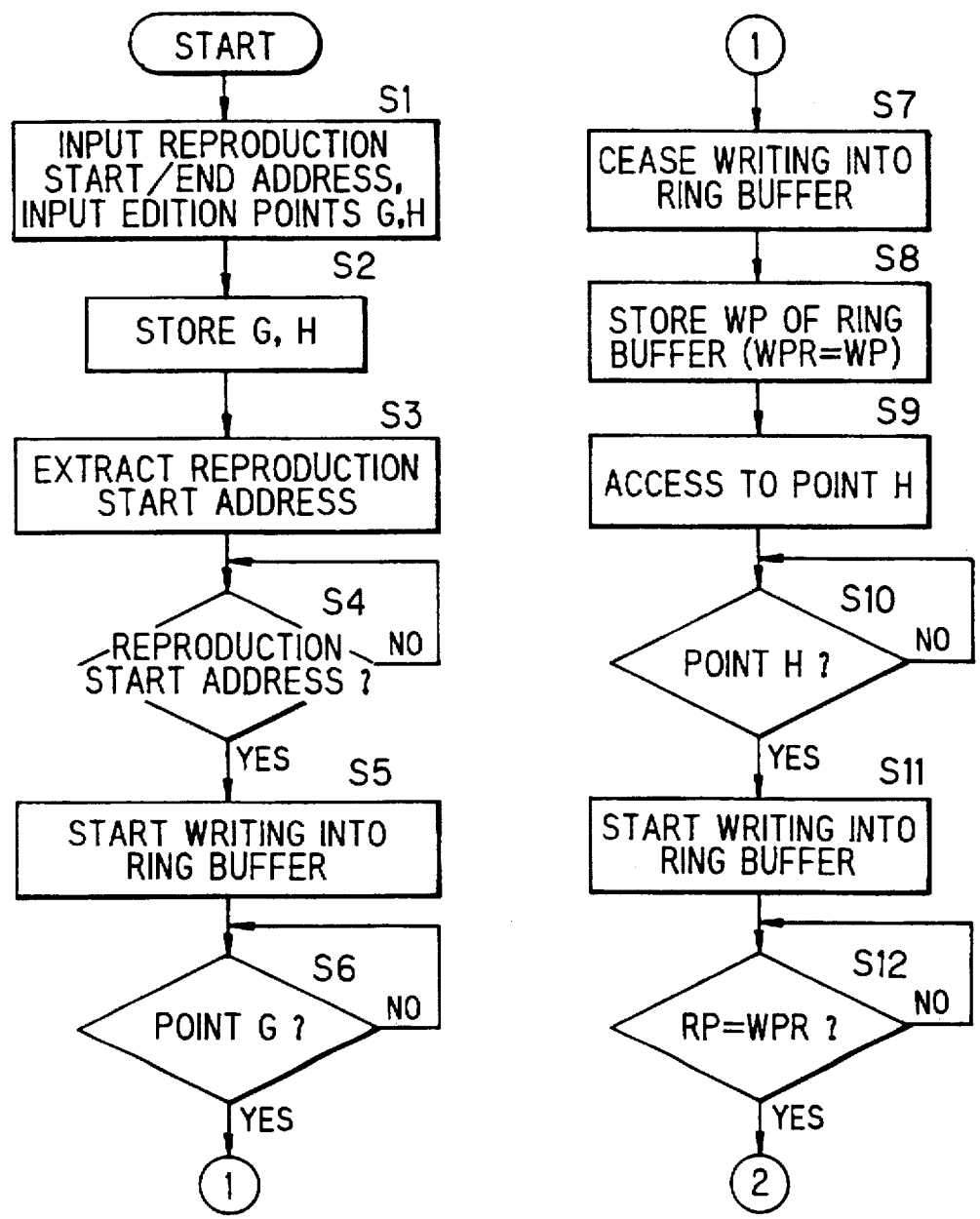
FIG. 11 is a flowchart showing the operation of the first embodiment shown in FIG. 10.
Figure 12:
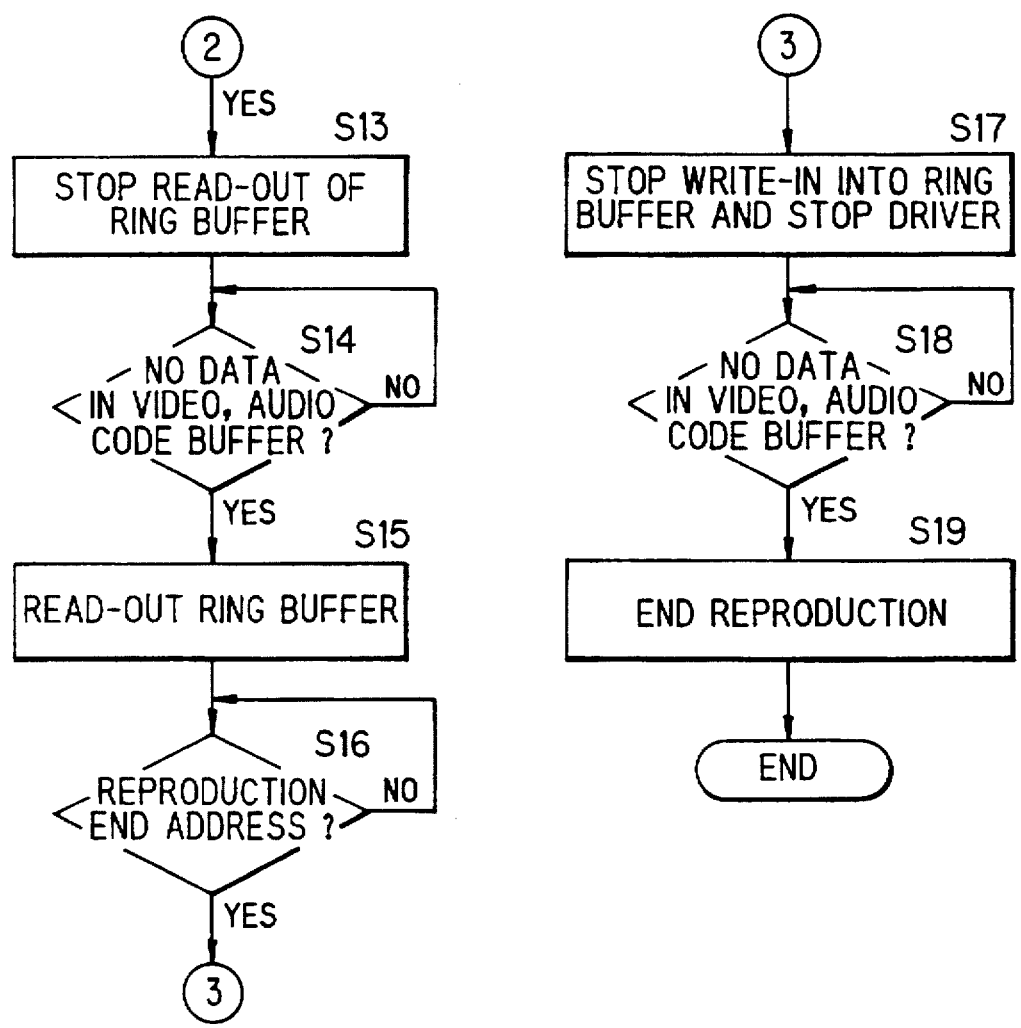
FIG. 12 is a flowchart subsequent to the flowchart of FIG. 11.

Next, the operation of the data reproducing device of the first embodiment shown in FIG. 10 will be described with reference to the flowcharts of FIGS. 11 and 12.

Figure 4:
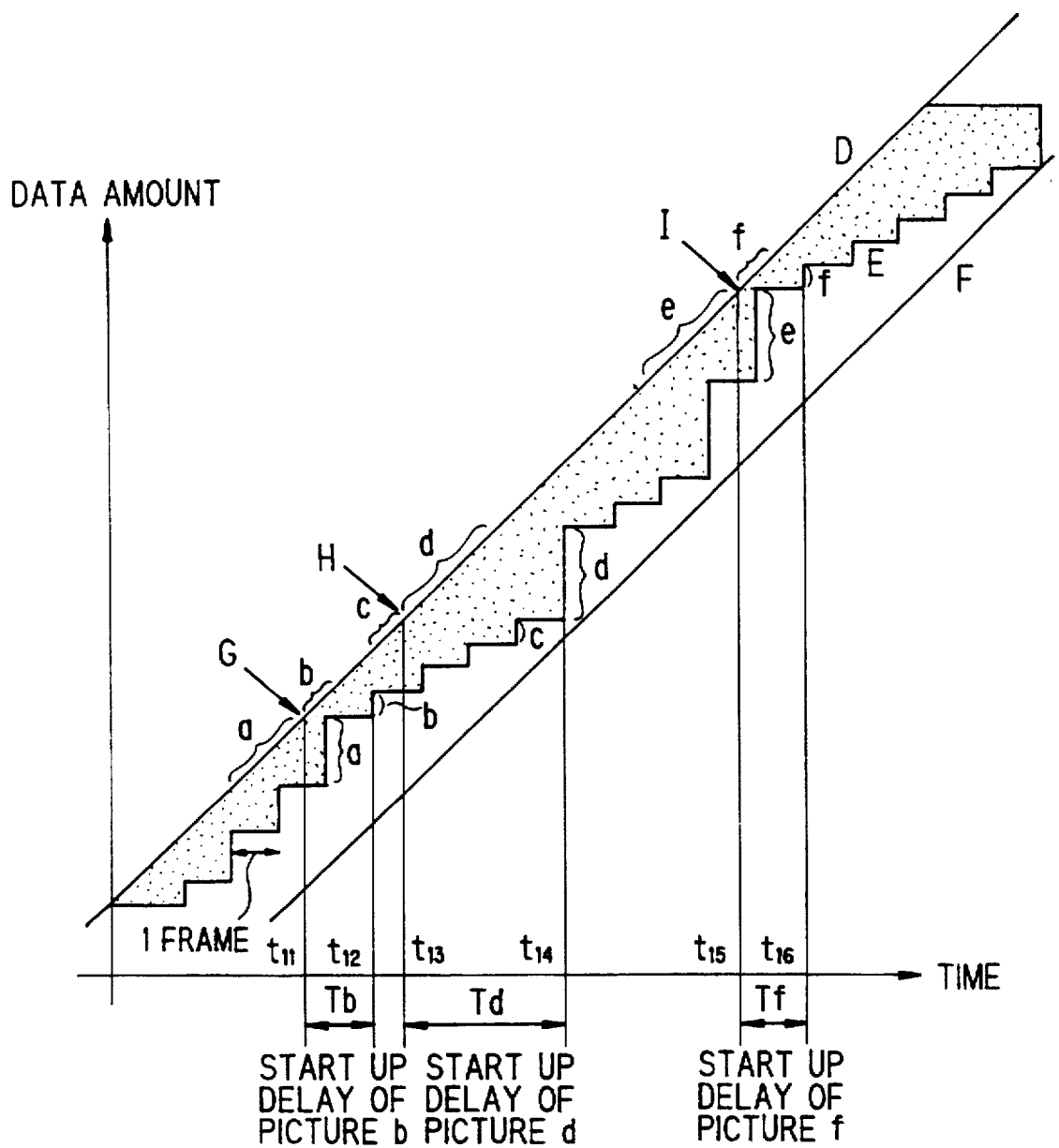
FIG. 4 is another timing chart showing the operation of the video code buffer of FIG. 1.
Figure 5:
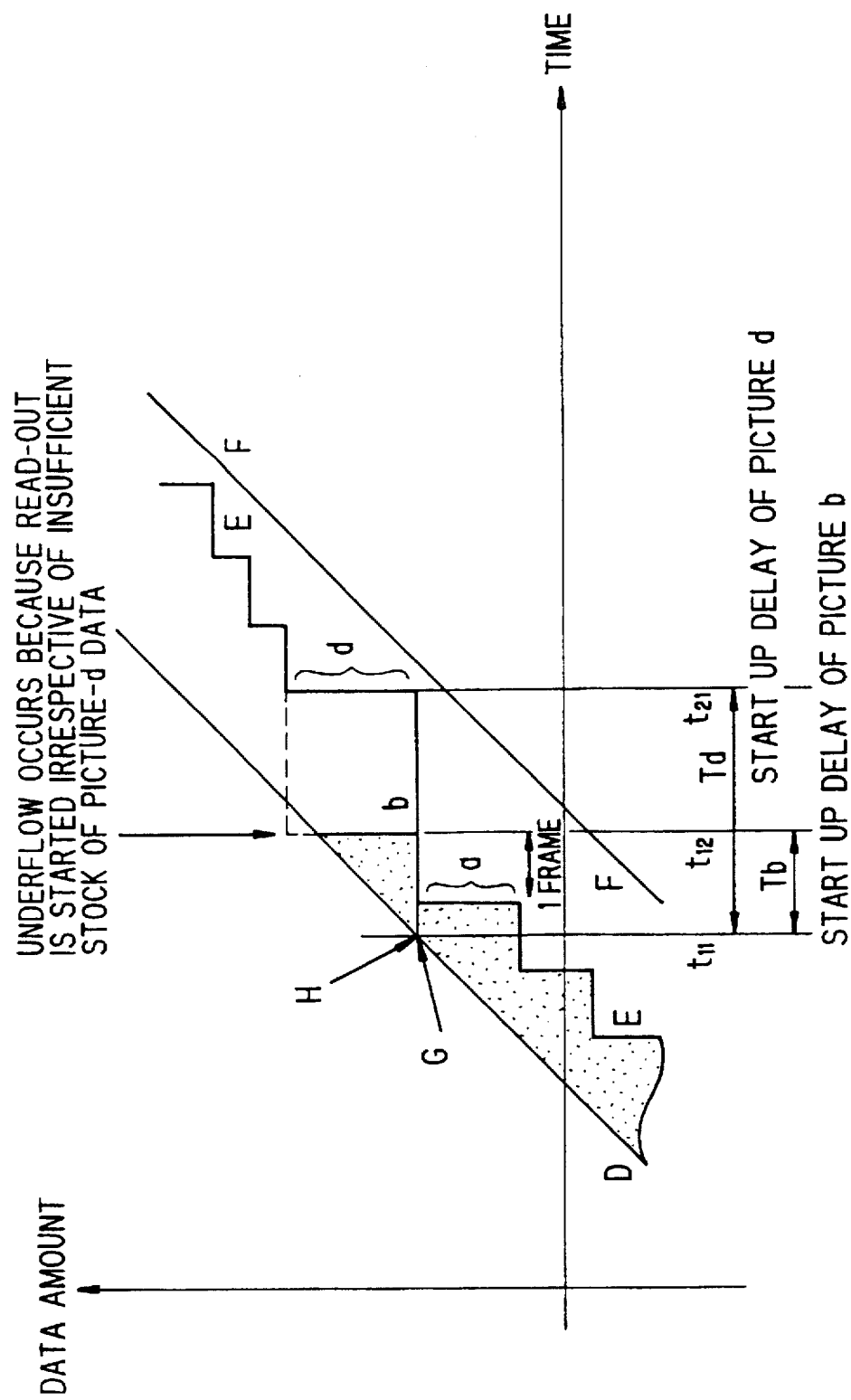
FIG. 5 is another timing chart showing the operation of the video code buffer 6 of FIG. 1.
Figure 6:
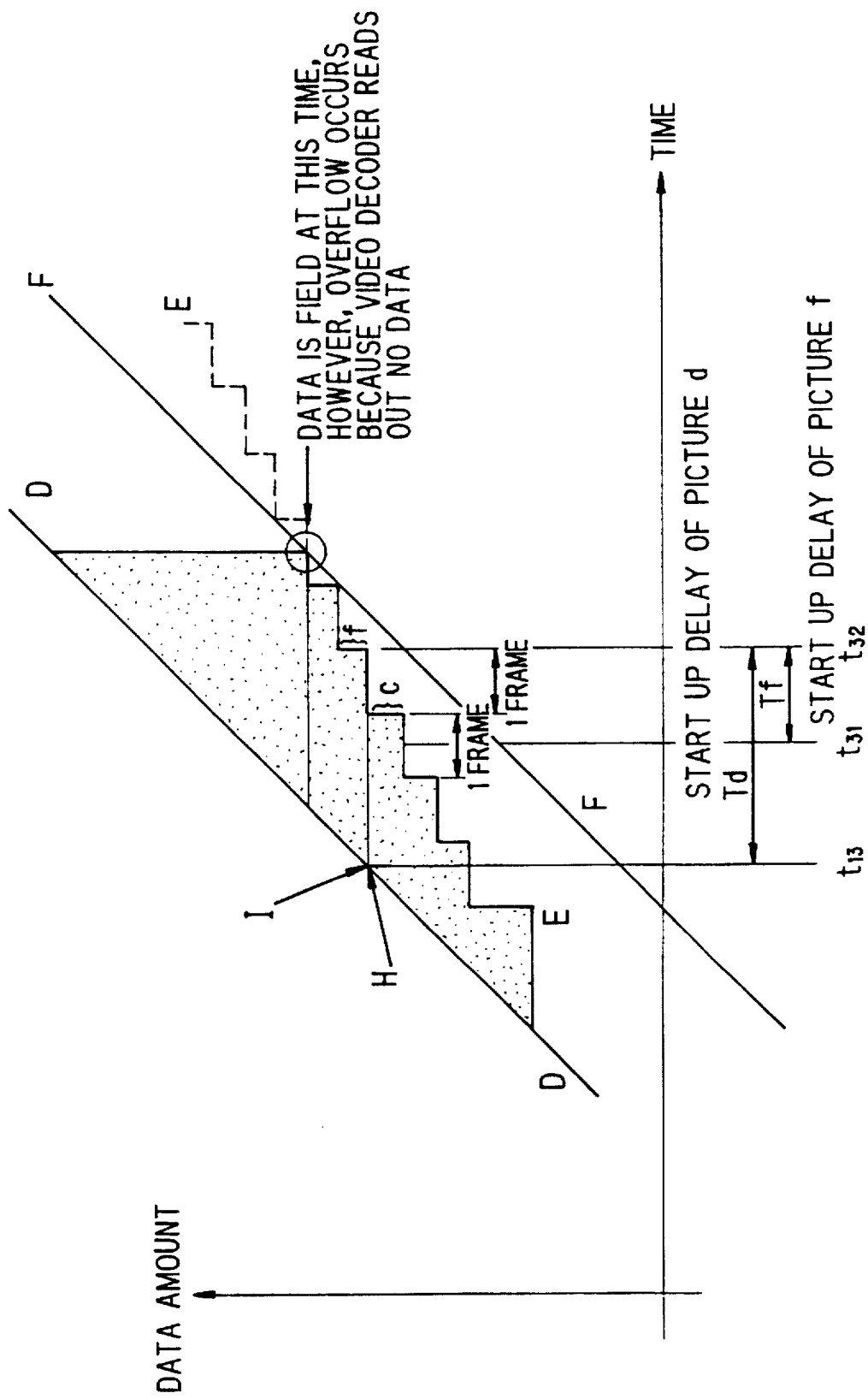
FIG. 6 is another timing chart showing the operation of the video code buffer 6 of FIG. 1.
Figure 7:
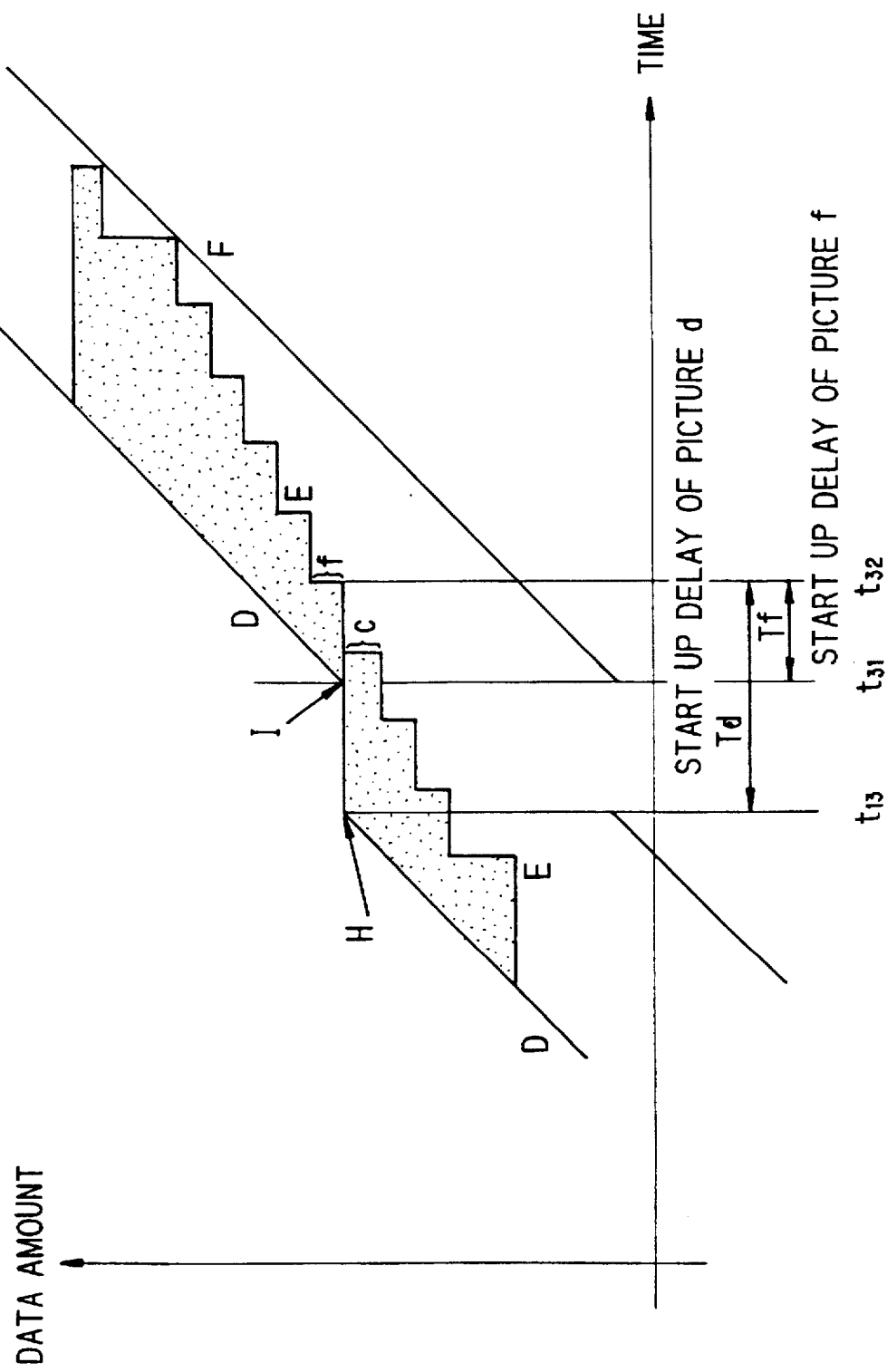
FIG. 7 is another timing chart showing the operation of the video code buffer 6 of FIG. 1.

First, at a step S1, a reproduction start address, a reproduction end address, edition points G, H (or H,I) (these points correspond to the points shown in FIG. 4), and an edition start are input through manipulation of the input unit 29. These addresses and the edition points are indicated as addresses of an optical disc (not shown) which is driven by the driver 1.

Subsequently, the process goes to a step S2 at which the control circuit 28 supplies an address storing circuit 30 with these reproduction start address, the reproduction end address and the addresses of the edition points, which are input through the input unit 29, and controls the address storing circuit 30 to store these addresses. Subsequently, the process goes to a step S3 at which the control circuit 28 controls the driver 1 to start the reproducing operation. At this time, the driver 1 irradiates a laser beam on the optical disc (not shown) which is installed in the driver 1, and data recorded on the optical disc are reproduced with light reflected from the optical disc. This reproduction signal is supplied to a demodulation unit 2. The demodulation unit 2 demodulates the signal supplied from the driver 1, and supplies the demodulation result to an ECC circuit 3. The ECC circuit 3 detects and corrects errors of the data supplied from the demodulation unit 2, and then outputs the corrected data to a ring buffer 4 and an address extraction circuit 31.

The address extraction circuit 31 extracts an address component from the data input from the ECC circuit 3, and outputs the extraction result to the control circuit 28. The control circuit 28 can know the reproduction point of the driver 1 on the basis of the address input from the address extraction circuit 31.

Subsequently, the process goes to a step S4, and the control circuit 28 is kept on standby until the read-out address supplied from the address extraction circuit 31 is coincidence with the reproduction start address stored in the address storing circuit 30. If both addresses are coincident with each other, that is, if the reproduction point arrives at the reproduction start address indicated at the step S1, the process goes to a step S5 at which the control circuit 28 controls the ring buffer 4 to start the write-in of the data supplied from the ECC circuit 3. Through this operation, data subsequent to the reproduction start address indicated at the step S1 are successively written in the ring buffer 4.

Subsequently, the process goes to a step S6 at which the control circuit 28 is kept on standby until the read-out address output from the address extraction circuit 31 is coincident with the address of an edition point (jump target point) G stored in the address storing circuit 30. When the reproduction point arrives at the edition point G, the process goes to a step S7 at which the control circuit 28 ceases the data write-in operation of the ring buffer 4. Through this operation, the data till the edition point G are stored in the ring buffer 4. Thereafter, the process goes to a step S8 to read out a writing position WP at that time in the ring buffer 4, and store it into the discontinuous point storing circuit 50 as a discontinuous point WPR of the data in the ring buffer 4.

Subsequently, the process goes to a step S9 at which the control circuit 28 controls the driver 1 to jump (discontinuously shift) the reproduction point to the edition point (jump target point) H. That is, the pickup of the driver 1 is jumped from the point G to the point H. The control circuit 28 monitors the read-out address output from the address extraction circuit 31, and it is kept on standby at a step S10 until the read-out address is coincident with the address at the edition point H which is stored at the step S2. If both addresses are coincident with each other, the process goes to a step S11 to re-start the data writing operation into the ring buffer 4. Through this operation, the data subsequent to the edition point H are written into the ring buffer 4 subsequently to the data till the edition point G. As a result, the data of the edition points G and H are continuously located on the ring buffer 4.

The data written in the ring buffer 4 are read out as described above, and supplied to the multiplexed data separation unit 5. The control circuit 28 monitors a reading position (reading point) RP of the ring buffer 4 while the discontinuous data are stored in the ring buffer 4. The control circuit 28 is on standby until the reading point RP is coincident with the discontinuous point WPR stored at the step S8. When the reading point RP is coincident with the discontinuous point WPR, the process goes to a step S13 to cease the read-out of the ring buffer 4.

That is, the data up to the edition point G which are stored in the ring buffer 4 are read out from ring buffer 4, input to the data separation circuit 21 and separated into video data and audio data. The video data are supplied to the video code buffer 6, and the audio data are supplied to the audio code buffer 8. Further, the data separation circuit 21 separates the DTSV signal, the DTSA signal, the SCR signal from the data input thereto, and supplies these signals to a DTSV register 22, a DTSA register 24 and an STC register 26, respectively. Every time a new signal is input, each of the DTSV register 22, the DTSA register 24 and the STC register 26 latches the signal.

After the STC register 26 stores the SCR signal supplied from the data separation circuit 21, it counts clocks which are output from a clock generating circuit 27 to add the count value to the stored SCR value and increment the SCR value. As a result, the STC register 26 outputs the STC signal representing the current time. The STC signal is supplied to comparators 23 and 25. The comparators 23 and 25 compare the current time (STC signal) with the DTSV signal or DTSA signal which is output from the DTSV register 22 or DTSA register 24. If both signals are coincident with each other, these comparators 23 and 25 generate a video decode start signal and an audio decode start signal respectively, and output these signals to the video decoder 7 and the audio decoder 9, respectively.

When supplied with the video decode start signal from the comparator 23, the video decoder 7 reads out and decodes video data of one frame which are stored in the video code buffer 6, and then output the decoded data to a circuit (not shown). Further, when supplied with the audio decode start signal, the audio decoder 9 reads out and decodes audio data of one unit from the audio code buffer 8, and then output the decoded data to a circuit (not shown).

Actually, all of frames are not necessarily added with DTS, and thus the decode start signals are not necessarily input to the video decoder 7 and the audio decoder 9 from the comparators 23 and 25 respectively at all the decode start timings. Therefore, each of the video decoder 7 and the audio decoder 9 has a timing generation function therein, and automatically starts its decoding operation for a next frame even when no decode start signal is input at the time when the decoding operation for the next frame should be started.

The video signals and the audio signals are successively output up to the edition point G from the video decoder 7 and the audio decoder 9 in the manner as described above.

Thereafter, when the read-out of the ring buffer 4 is ceased at a step S13, the process goes to a step S14 at which the control circuit 28 is on standby until the decoding operation of the video decoder 7 and the audio decoder 9 is finished and the decode processing for the video data and the audio data up to the edition point G is completely finished.

When the decode processing for the video data and the audio data up to the edition point G is completed, the process goes to a step S15 to restart the read-out operation of the ring buffer 4. As described above, the data to the edition point G and the data from the edition point H are continuously stored in the ring buffer 4. Accordingly, the data can be read out from the ring buffer 4 immediately after the decoding operation in the video decoder 7 and the audio decoder 9 is completed, and thus it takes a very short time at the intermission between the completion of the decoding operation in the video and audio decoders 7 and 9 and the start of the read-out operation from the ring buffer 4. Thereafter, the data from the edition point which are read out from the ring buffer 4 are decoded and output by the video decoder 7 and the audio decoder 9 in the manner as described above.

Subsequently, the process goes to a step S16 at which the control circuit 28 is on standby until the read-out address output from the address extraction circuit 31 is coincident with the reproduction end address stored in the address storing circuit 30. If both addresses are coincident with each other, the process goes to a step S17 to cease the data write-in operation into the ring buffer 4, and also cease the reproducing operation of the driver 1. At a step S18, all the data of the video code buffer 6 and the audio code buffer 8 are read out from the video decoder 7 and the audio decoder 9, and the process is on standby until the decoding operation is completed. When the decoding operation is completed, the process goes to a step S19 to finish the reproducing operation.

Figure 13:
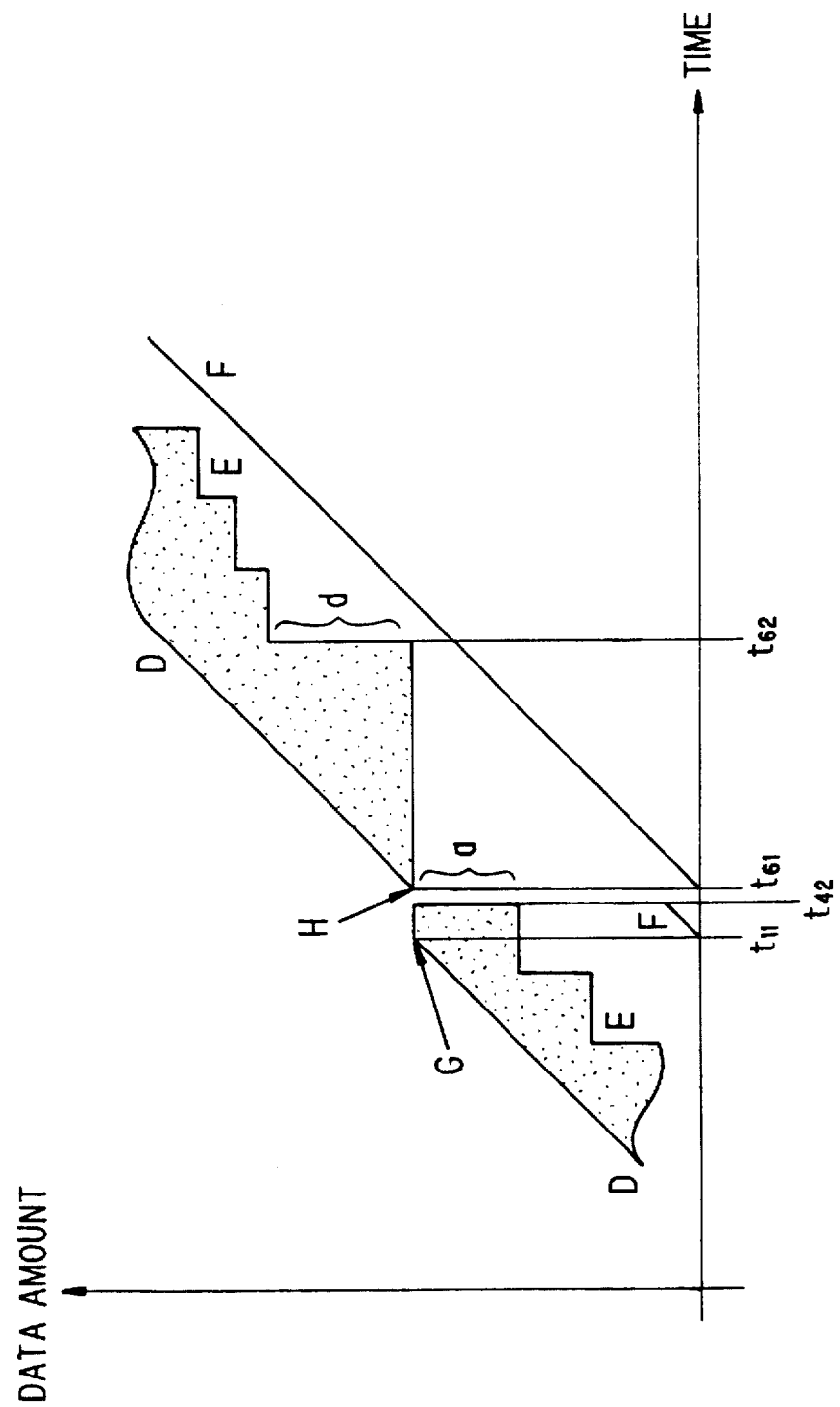
FIG. 13 is a diagram showing the operation of a video code buffer 6 of FIG. 10.
Figure 14:
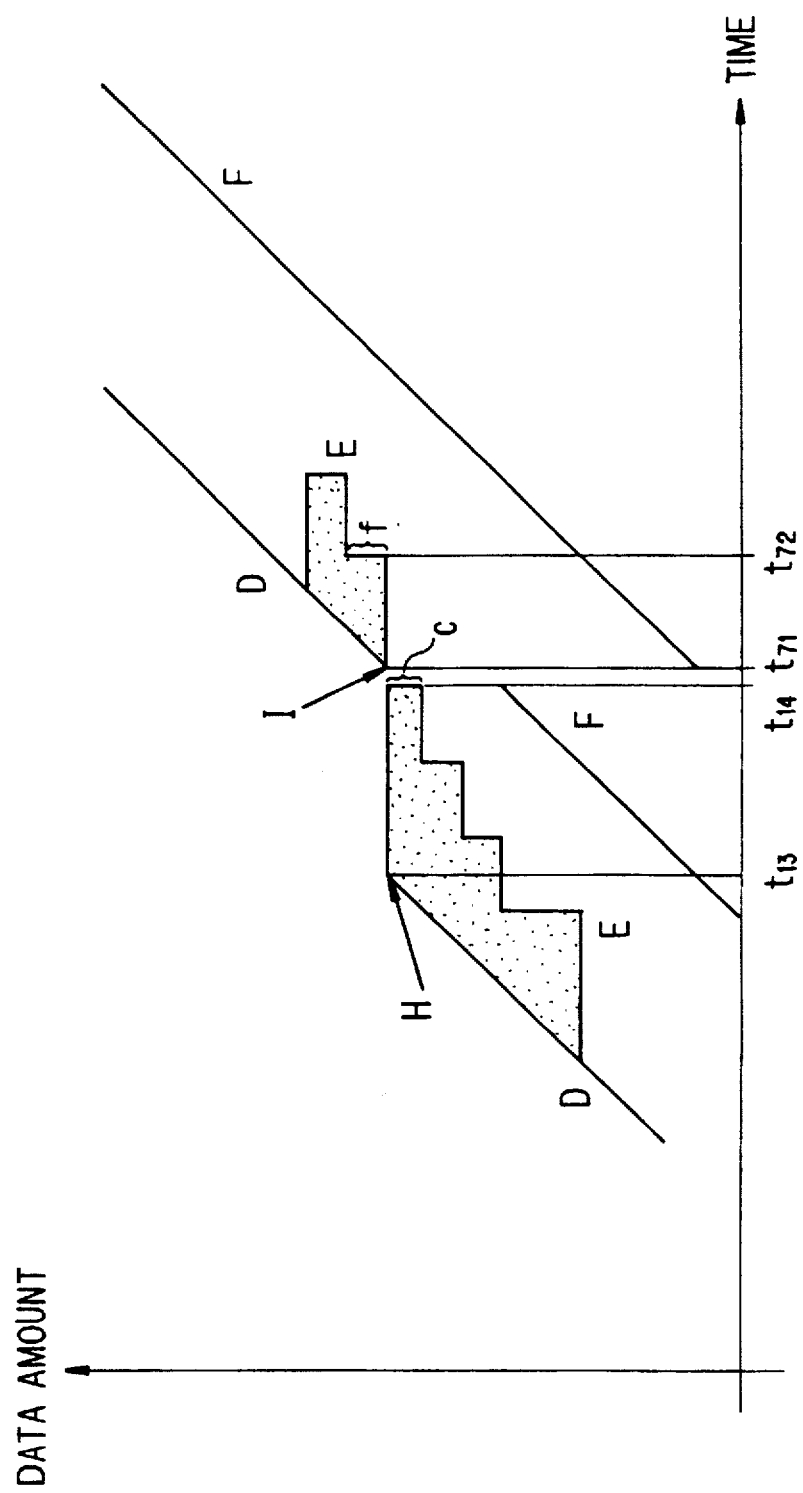
FIG. 14 is a diagram showing the video code buffer 6 of FIG. 10.

FIGS. 13 and 14 show the data write-in and read-out states for the video code buffer 6 in cases where the reproduction point is jumped from the point G to the point H and where the reproduction point is jumped from the point H to the point I, respectively.

As shown in FIG. 13, the jump from the point G to the point H is carried out at the time t11. The data of the picture a which have been written till the point G are read out from the video code buffer 6 to the video decoder 7 at a time t42, and decoded. Thereafter, at a time t61, the data write-in operation from the point H is started, and at a time t62, the data of the picture d are read out from the video code buffer 6 to the video coder 7 and decoded.

In FIG. 14, the jump from the point H to the point I is carried out at a time t13, and the data which have been written in the video code buffer 6 till the time t13 are read out to the video decoder 7 and decoded for a period from the time t13 to the time t14. Thereafter, at a time t71, the data from the point I are written into the video code buffer 6, and at a time t72 the data of the picture f are read out from the video code buffer 6 to the video decoder 7 and decoded.

Figure 8:
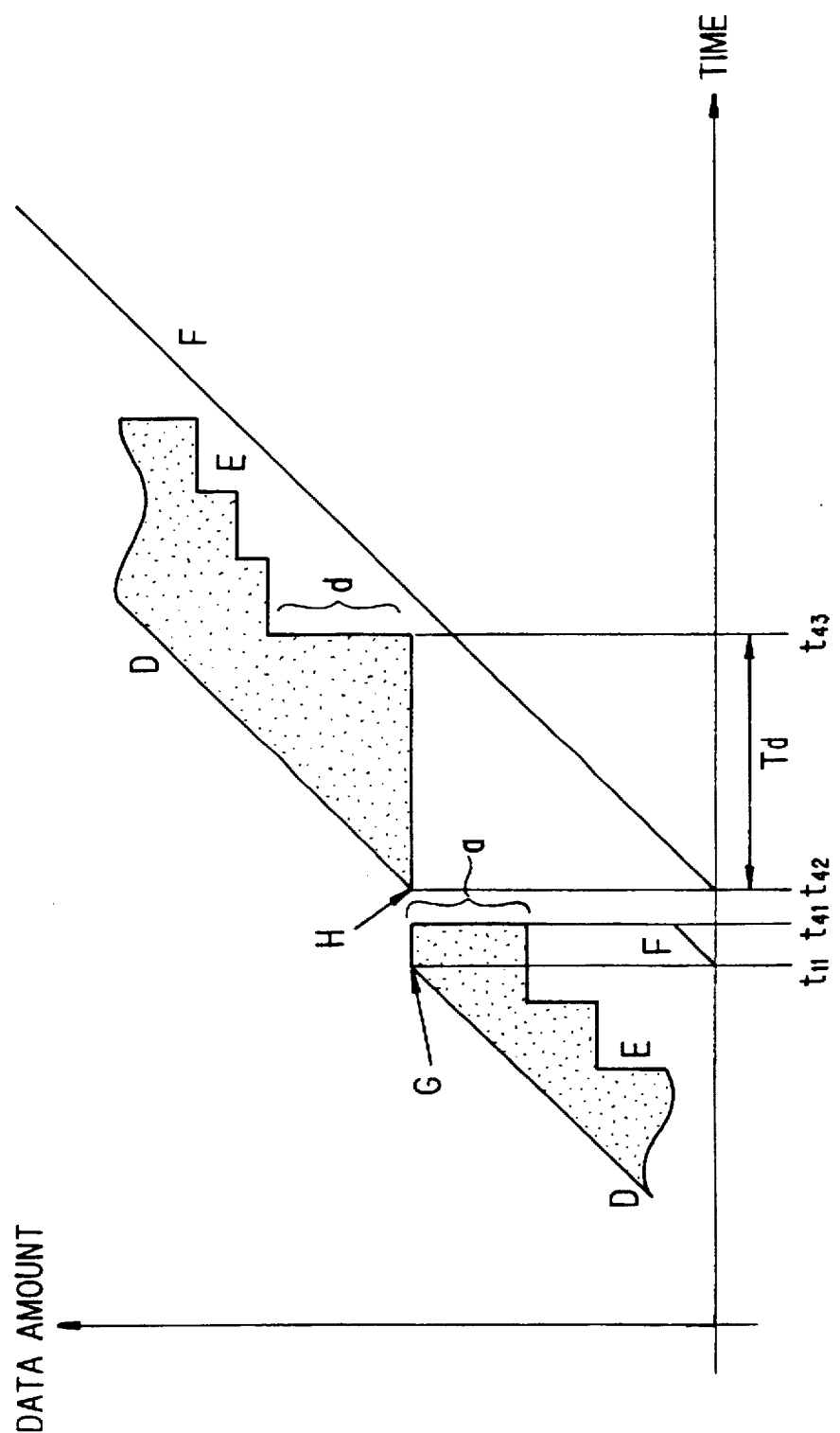
FIG. 8 is another timing chart showing the operation of the video code buffer 6 of FIG. 1.
Figure 9:
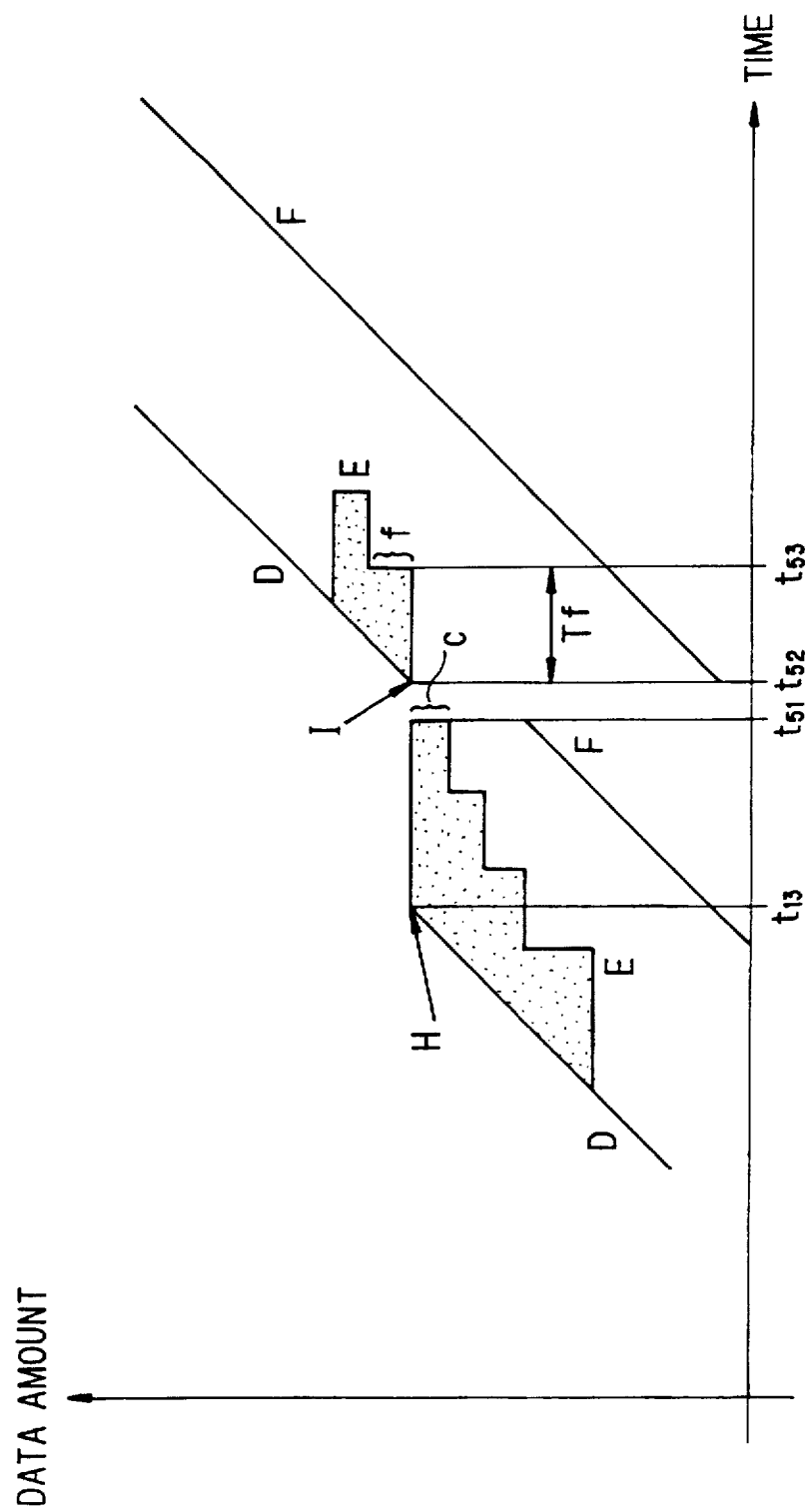
FIG. 9 is another timing chart showing the operation of the video code buffer 6 of FIG. 1.

As is apparent from the comparison between FIGS. 13 and 8 or between FIGS. 14 and 9, the operation of the video code buffer 6 of this embodiment is basically identical to that of the prior art. However, as described above, the data till the point G and the data from the point H or the data till the point H and the data from the point I are continuously stored in the ring buffer 4, so that the data lack period (a period in which data are lacking) can be more shortened than the prior art.

That is, the period from the time t11 to the time t42 in FIG. 8 or the period from the time t13 to the time t52 in FIG. 9 is a time required to temporarily finish the reproducing operation of the driver 1 at the point G or H and then restart the reproducing operation at the point H or I.

On the other hand, in the embodiment shown in FIG. 13 or 14, only the jump operation of a pickup from the pint G to the point H or from the point H to the point I is carried out, and the reproducing operation is not finished. Accordingly, in the embodiment shown in FIGS. 13 and 14, the period between the times t42 and t61 and the period between the times t14 and t71 can be more shortened than the period between the times t41 and t42 in FIG. 8 and the period between the times t51 and t52 in FIG. 9.

Figure 16:
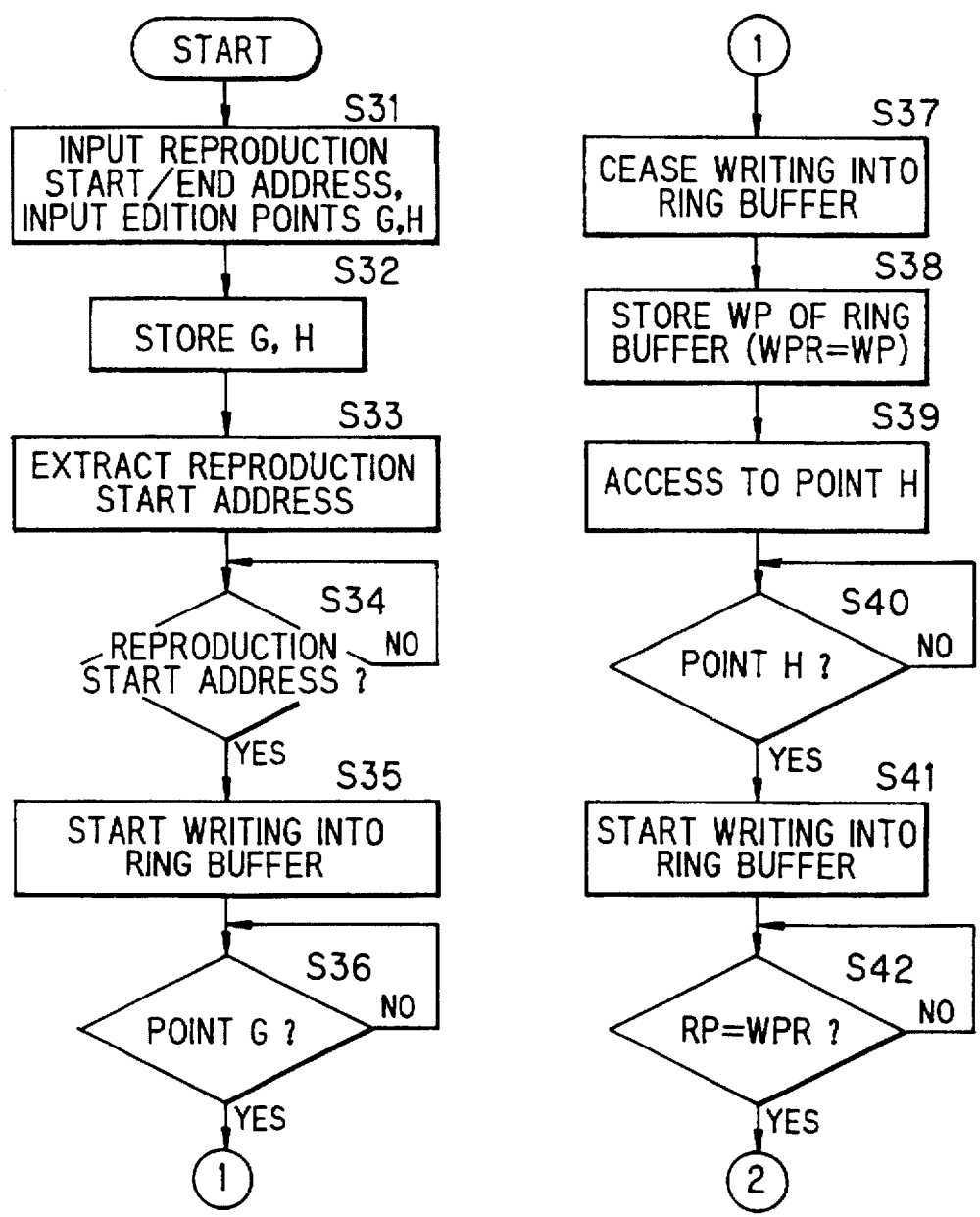
FIG. 16 is a flowchart showing the operation of the embodiment of FIG. 15.

FIG. 16 shows a second embodiment of the data reproducing device according to this invention. In this embodiment, the write-in address and the read-out address of the video code buffer 6 are supplied to the control circuit 28. The other construction is identical to that of FIG. 10.

Figure 15:
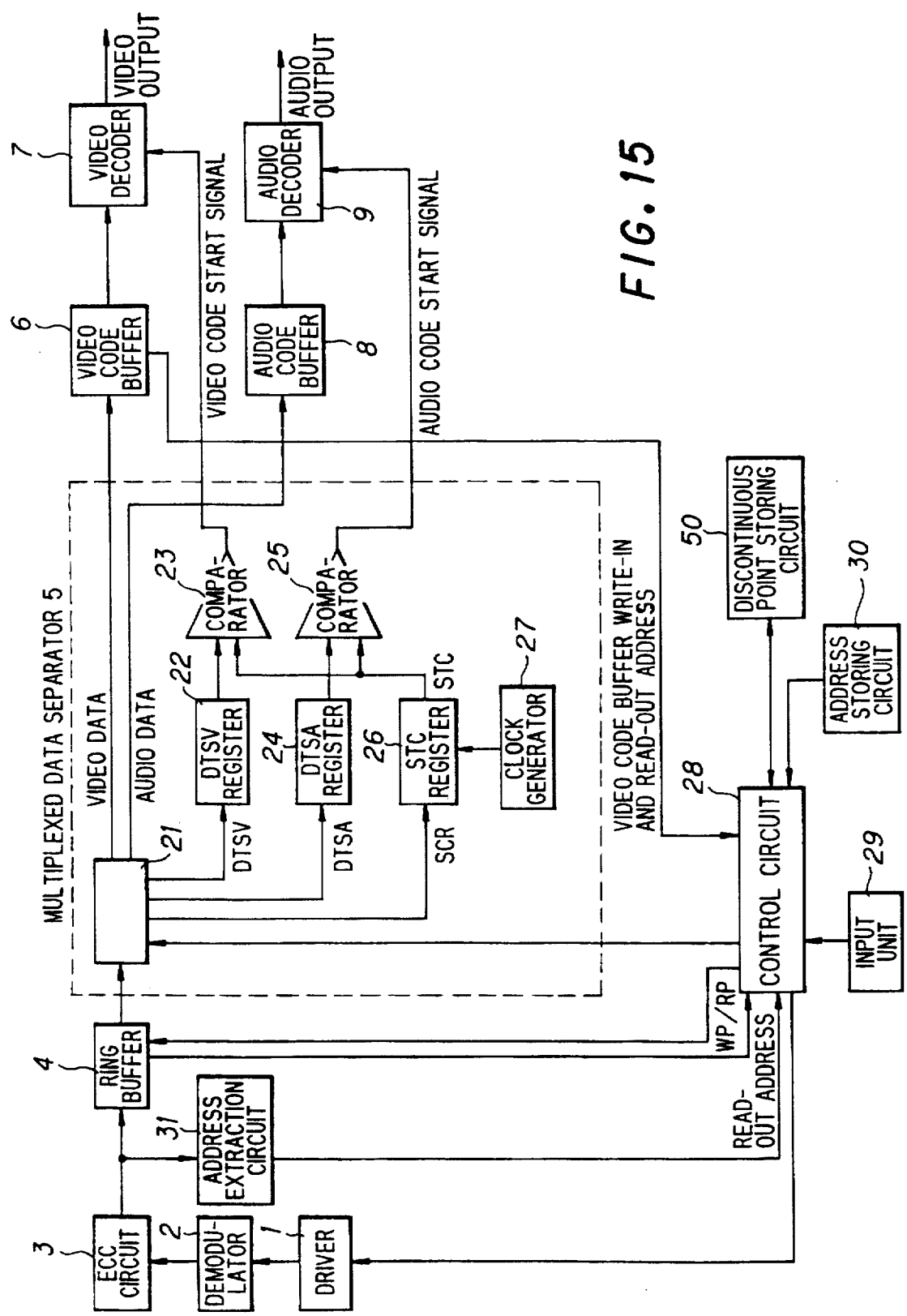
FIG. 15 is a block diagram showing the construction of another embodiment of the data reproducing device according to this invention.
Figure 17:
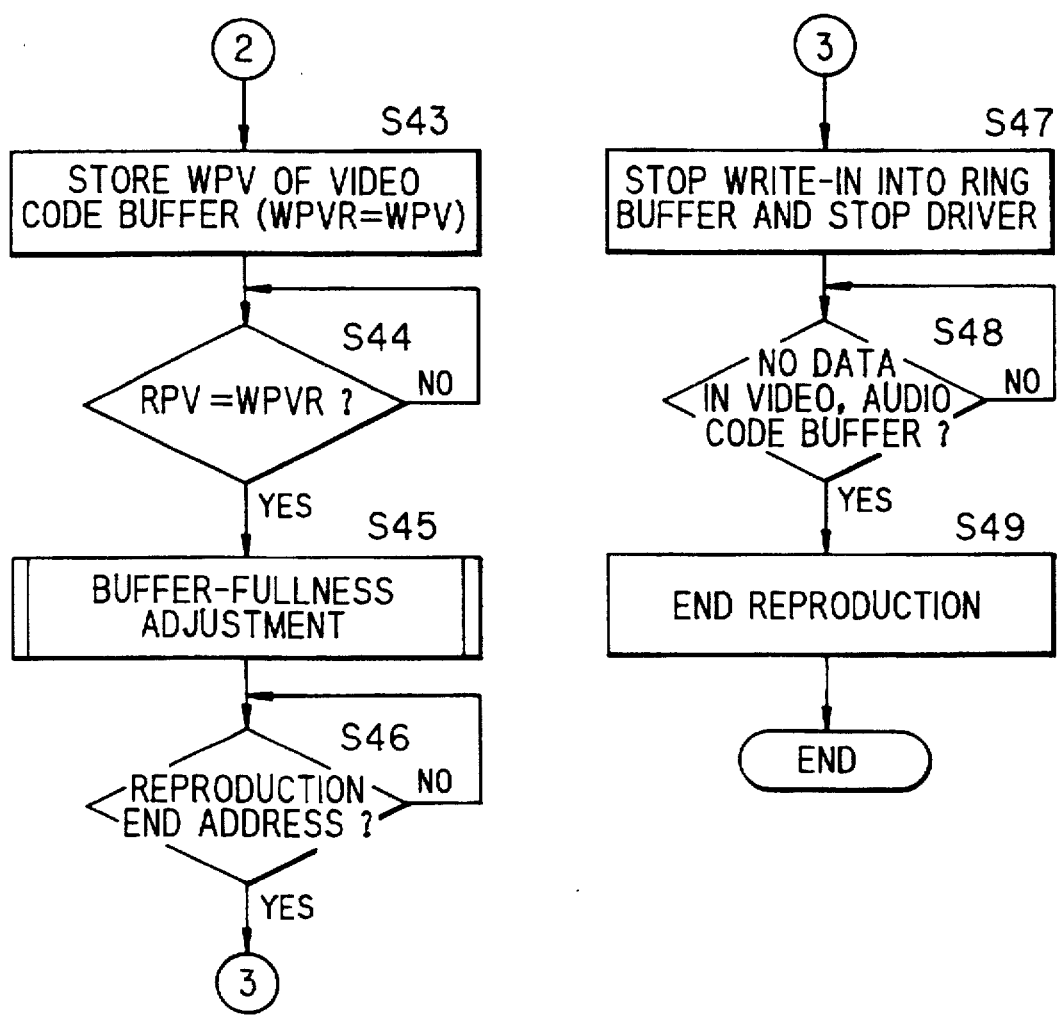
FIG. 17 is a flowchart subsequent to the flowchart of FIG. 16.

Next, the operation of the embodiment shown in FIG. 15 will be described with reference to the flowcharts of FIGS. 16 and 17. The processing at steps S31 to S42 is similar to the processing at the steps S1 to S12 shown in FIG. 11. That is, through this processing, the data till the point G and the data from the point H are continuously written in the ring buffer 4. Further, the address WPR of the discontinuous point is stored in the ring buffer 4. During the data read-out operation from the ring buffer 4, when the reading point RP reaches the discontinuous point WPR stored in the discontinuous point storing circuit 50, it is detected.

If the reading point RP of the ring buffer 4 is judged to reach the discontinuous point WPR at a step S42, the process goes to a step S43 to store into the discontinuous point storing circuit 50 the writing point WPV of the video code buffer 6 at that time as a discontinuous point WPVR.

The data containing the discontinuous point are successively input and written into the video code buffer 6 from the ring buffer 4 through the data separation circuit 21. The control circuit 28 monitors the reading point RPV of the video code buffer 6 during the period for which the discontinuous point WPVR exists. At a step S44, the process is on standby until the reading point RPV is equal to the discontinuous point WPVR stored at the step S43.

If both addresses are judged to be coincident with each other at the step S44, the process goes to a step S45 to execute a buffer-fullness adjustment processing. The details of the buffer-fullness adjustment processing will be later described with reference to FIGS. 32 and 35. This adjustment processing is performed so that the data storage amount of the video code buffer 6 is set to a proper value. Through this processing, the data lack period of the reproduction data at the jump operation time can be shortened further.

Subsequently, the process goes to a step S46, and it is on standby until the read-out address extracted by the address extraction circuit 31 is coincident with the reproduction end address stored in the address storing circuit 30. When both addresses are coincident with each other, the process goes to a step S47 to stop the writing operation of the data into the ring buffer 4 and the reproducing operation of the driver 1. Thereafter, the process goes to a step S48 to wait until the data stored in the video code buffer 6 and the audio code buffer 8 are decoded by the video decoder 7 and the audio decoder 9, respectively. When the decoding operation of these data is completed, the process goes to a step S49 to end the reproducing operation. The processing at the steps S46 to S49 is identical to that at the steps S16 to S19.

In this embodiment, the data storage amount (buffer-fullness) of the video code buffer 6 is checked and adjusted just before the discontinuous-point data are input to the video decoder 7, so that the treatment for the discontinuous point can be more rapidly performed.

Figure 18:
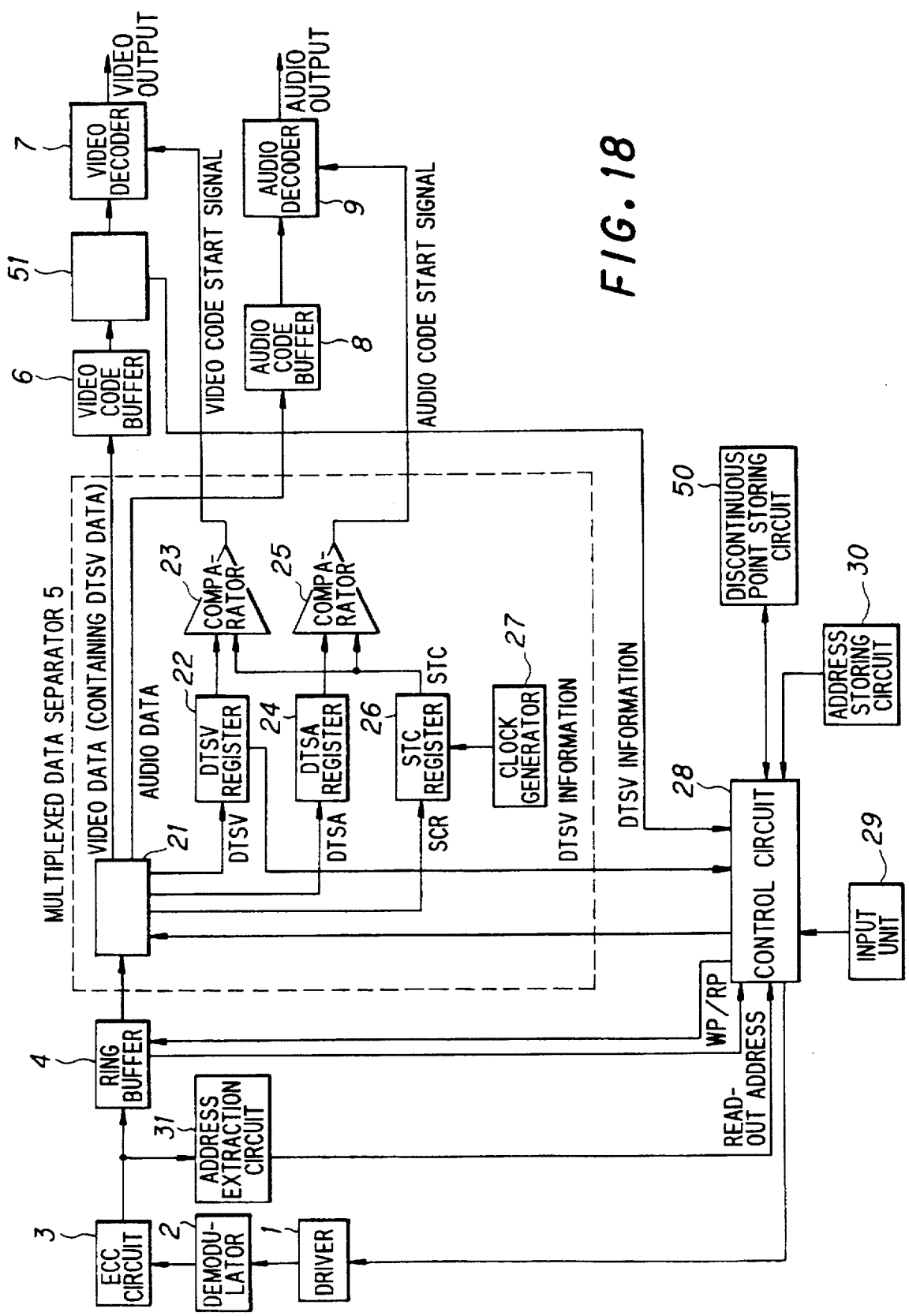
FIG. 18 is a block diagram showing the construction of another embodiment of the data reproducing device of this invention.

FIG. 18 shows a third embodiment of the data reproducing device according to this invention. In this embodiment, a DTSV extraction circuit 51 is provided between the video code buffer 6 and the video decoder 7. The DTSV extraction circuit 51 extracts a DTSV signal from the data read out from the video code buffer 6 and supplies the extraction result to the control circuit 28.

Figure 2:
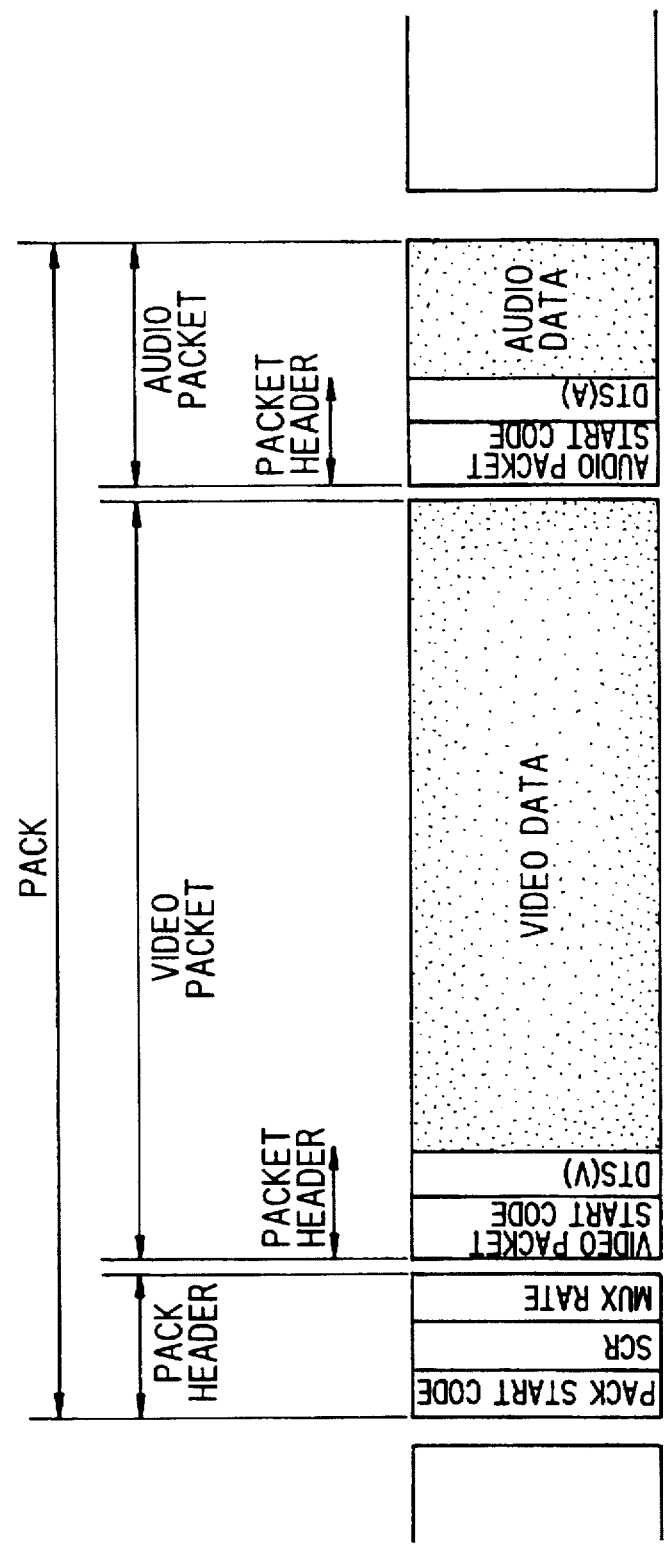
FIG. 2 is a diagram showing a data format of MPEG system.
Figure 3:
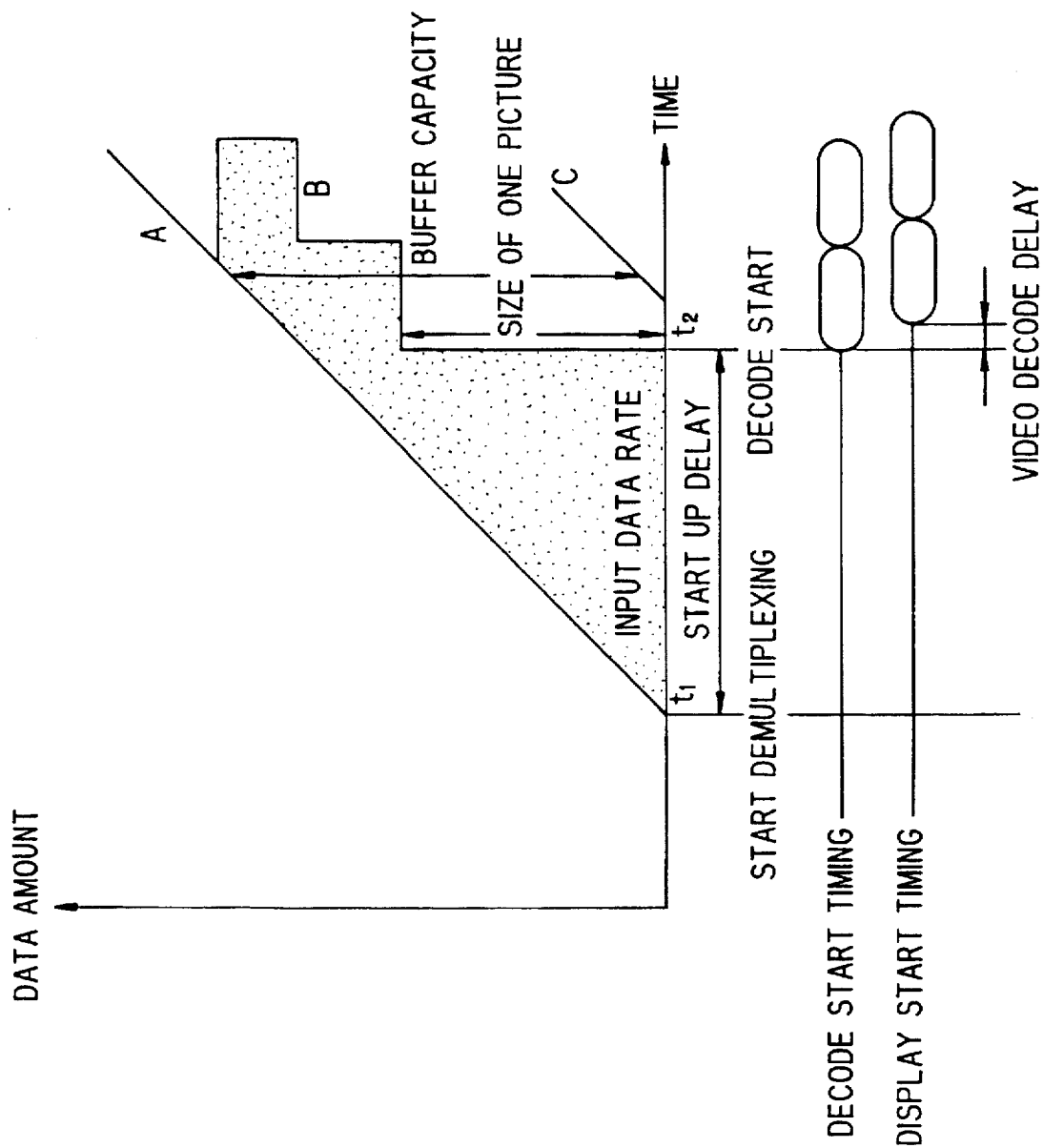
FIG. 3 is a timing chart showing an operation of a video code buffer 6 of FIG. 1.

Therefore, in this embodiment, the data separation circuit 21 supplies the video data to the video code buffer 6 while containing the DTSV signal. Specifically, the video data are output from the data separation circuit 21 to the video code buffer 6 while containing the packet header. The packet start code (see FIG. 2) in the packet header is special (unique) data in the video data, and thus it can be easily extracted.

Further, in this embodiment, the DTSV stored in the DTSV register 22 is supplied to the control circuit 28, and stored in the discontinuous point storing circuit 50. The other construction is similar to that of FIG. 10.

Figure 19:
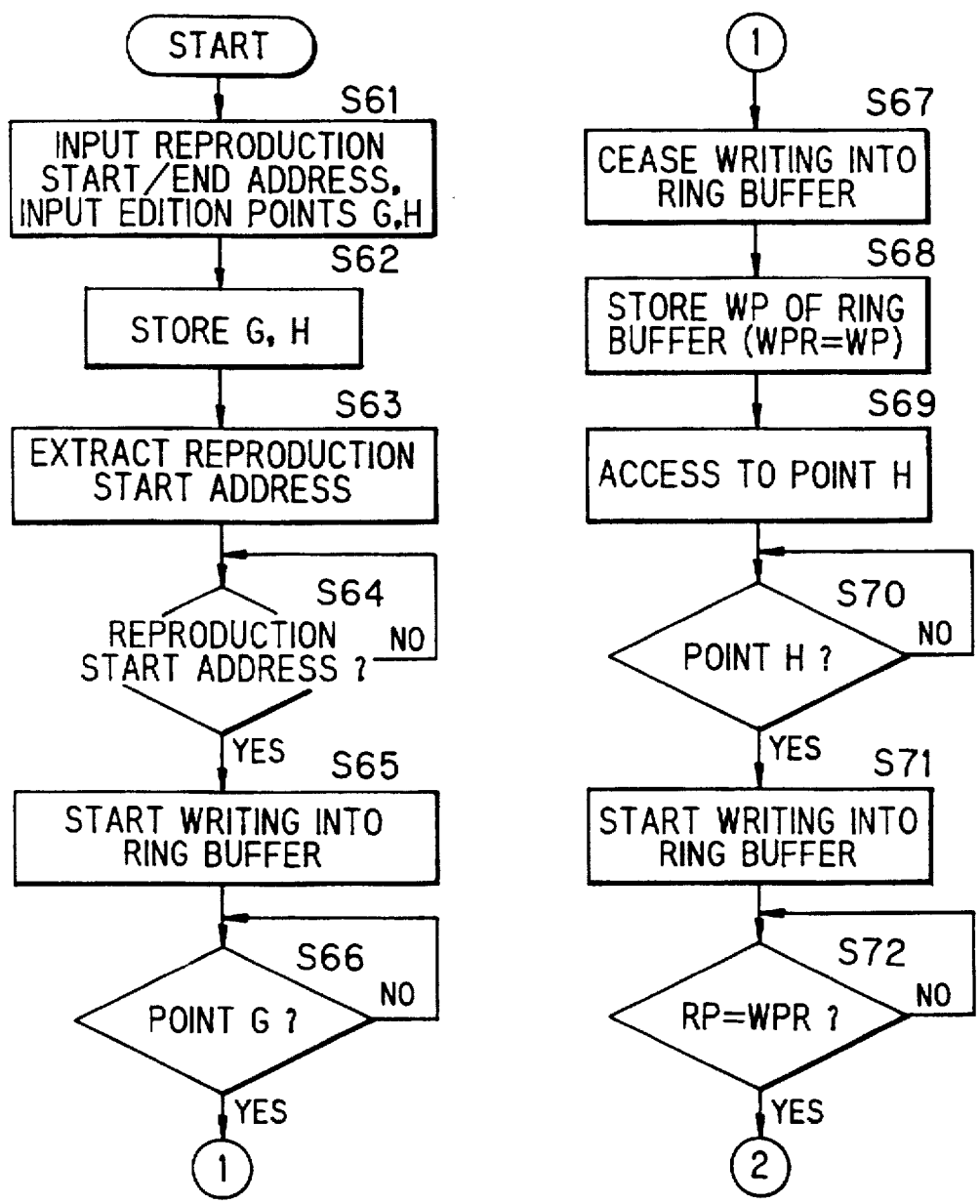
FIG. 19 is a flowchart showing the operation of the embodiment of FIG. 18.
Figure 20:
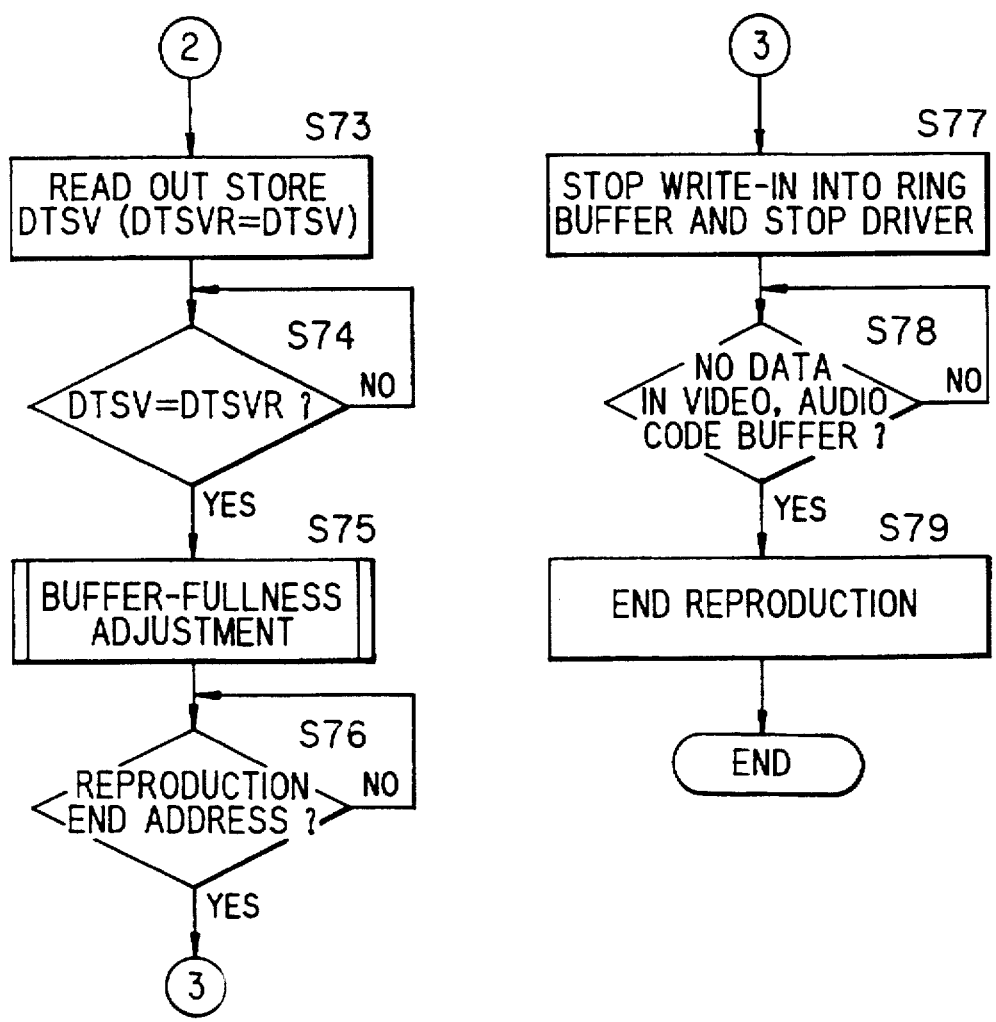
FIG. 20 is a flowchart subsequent to the flowchart of FIG. 19.

Next, the operation of the embodiment shown in FIG. 18 will be described with reference to the flowcharts of FIGS. 19 and 20. The processing at steps S61 to S72 is similar to that at the steps S1 to S12 of FIG. 11.

When at a step S72 it is judged that the reading point RP of the ring buffer 4 is equal to the discontinuous point WPR stored in the discontinuous point storing circuit 50, the process goes to a step S73 at which the control circuit 28 reads out the DTSV which is input to the DTSV register 22 after that time, and supplies and stores it as DTSVR in the discontinuous point storing circuit 50.

The DTSVR corresponds to the decode start time of the data containing the discontinuous point in the video decoder 7.

During a period for which the discontinuous point exists in the data read out from the video code buffer 6, the control circuit 28 monitors DTSVs output from the DTSV extraction circuit 51, and compares them with the DTSVR stored at the step S73. At a step S74, the control circuit 28 is on standby until the DTSV is coincident with the DTSVR. If both are coincident with each other, the control circuit 28 judges that the data containing the discontinuous point are input to the video decoder 7.

Subsequently, the process goes to a step S75 to execute the buffer-fullness adjustment processing. At steps S76 to S79, the reproduction processing is continued until the reproduction end address is detected. The processing at the steps S75 to S79 is identical to that at the steps S45 to S49.

As described above, in this embodiment, at the time when the discontinuous point is input to the multiplexed data separation unit 5, the DTSV value which is separated just after that time is kept as DTSVR, and the time when a DTSV having the same value as the DTSVR is extracted by the DTSV extraction circuit 51 is judged as the time at which the discontinuous-point data are input to the video decoder 7. Therefore, the data lack period of the reproduction data at the discontinuous point reproducing time can be shortened.

In the above embodiment, DTS is used as time information. A time code or temporal reference which is defined in a MPEG1 video may be used as the time information. In this embodiment, like the embodiment shown in FIG. 18, a DTSV extraction circuit 51 is provided between the video code buffer 6 and the video decoder 7. The output of the DTSV extraction circuit 51 is supplied to the control circuit 28. Further, the video decoder 7 outputs a picture decode signal to the control circuit 28 every time it decodes the data of one picture. However, in this embodiment, the output of the DTSV register 22 is not supplied to the control circuit 28. The other construction is identical to that of FIG. 18.

Figure 22:
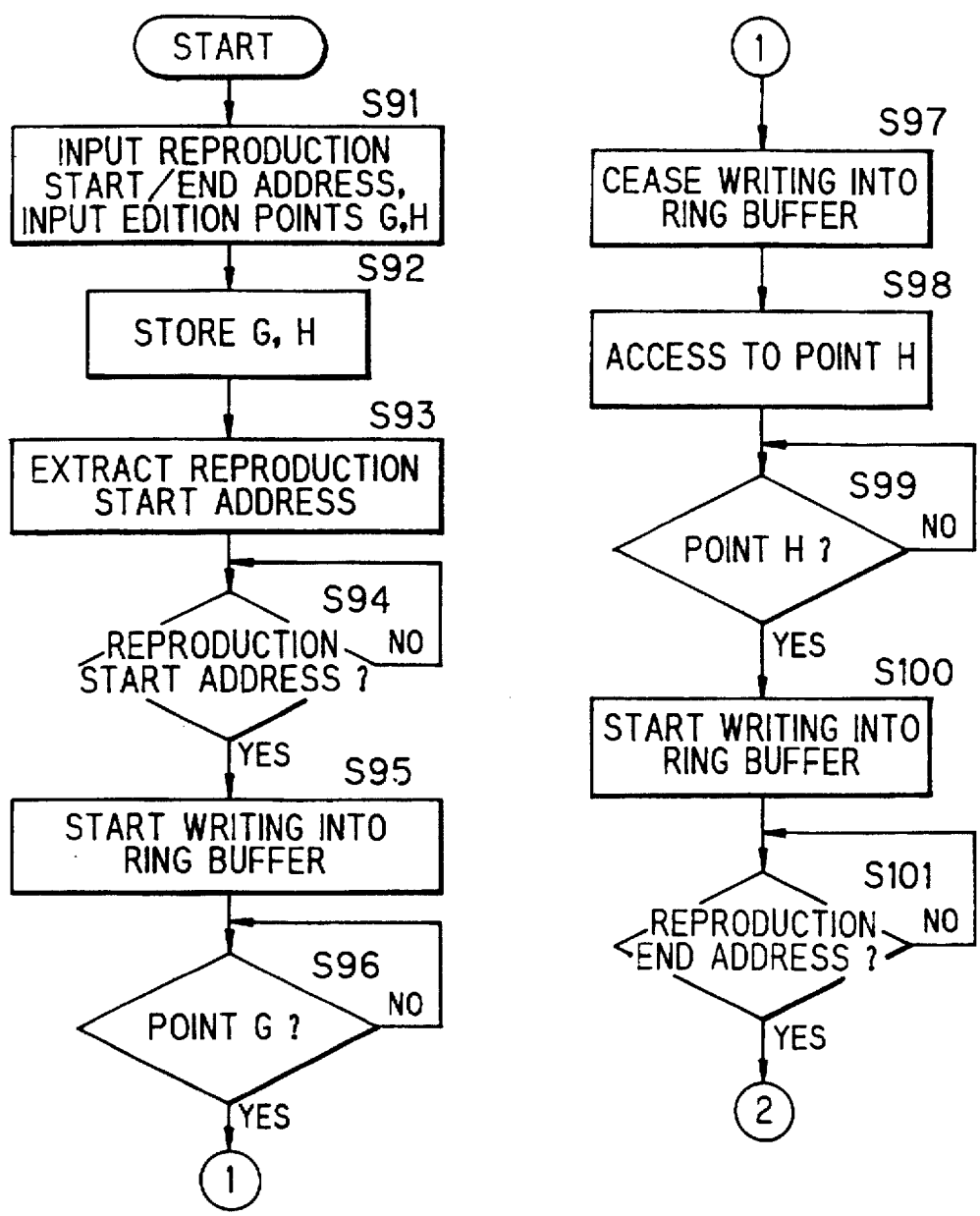
FIG. 22 is a flowchart showing the operation of the embodiment of FIG. 21.
Figure 23:
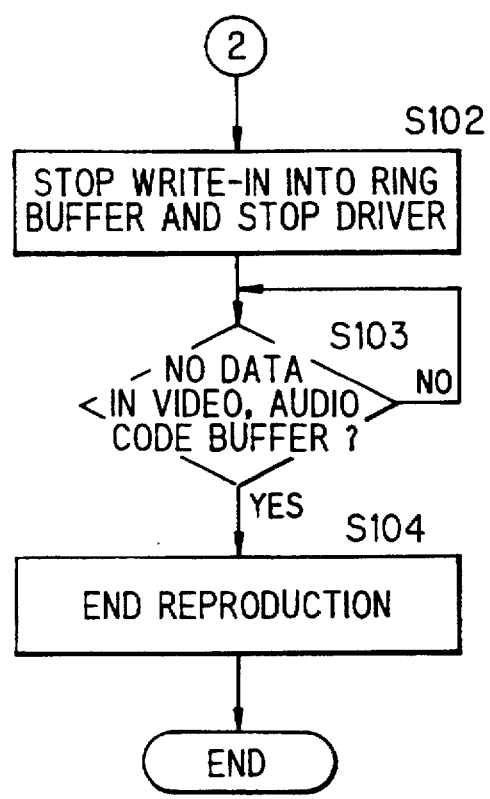
FIG. 23 is a flowchart subsequent to the flowchart of FIG. 22.
Figure 24:
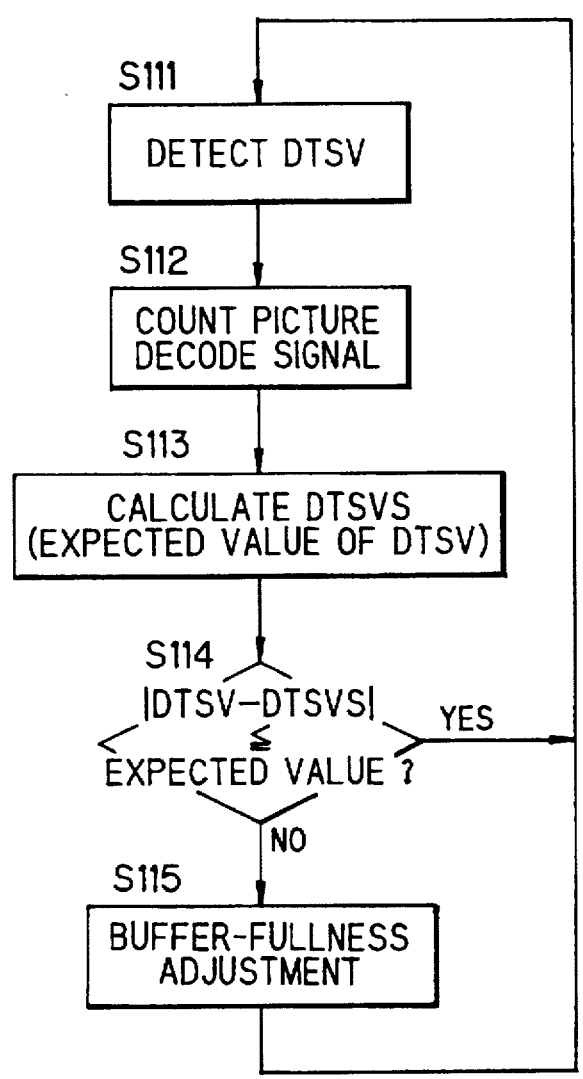
FIG. 24 is a flowchart showing the operation of the embodiment of FIG. 21.

Next, the operation of the embodiment of FIG. 21 will be described with reference to the flowcharts of FIGS. 22, 23 and 24. The processing at steps S91 to S104 of FIGS. 22 and 23 is basically identical to that at the steps S61 to S79, however, the processing at the step S68 and the steps S72 to S75 of FIGS. 19 and 20 is omitted. The processing shown in FIG. 24 is carried out at all times in parallel to the processing shown in FIGS. 22 and 23.

That is, in the processing of FIGS. 22 and 23, the data at the reproduction start address and subsequent addresses are written in the ring buffer 4 at a step S95, and when the point G to be jumped is detected at a step S96, the data write-in operation into the ring buffer 4 is ceased at a step S97. No storing processing for the writing point WP of the ring buffer 4 is carried out, and the process goes to a step S98 to immediately execute the access to the jump target point H. When the point H is detected at a step S99, the process goes to a step S100 to restart the data writing operation into the ring buffer 4 at that time. Through this operation, the data till the point G and the data from the point H are continuously stored in the ring buffer 4.

Subsequently, the process goes to a step S101, and waits until the read-out address extracted by the address extraction circuit 31 is coincident with the reproduction end address stored in the address storing circuit 30 at the step S92. When both address are coincident with each other, the process goes to a step S102 to stop the data writing operation into the ring buffer 4 and the reproducing operation of the driver 1. Thereafter, the process goes to a step S103 to wait until the data stored in the video code buffer 6 and the audio code buffer 8 are decoded by the video decoder 7 and the audio decoder 9 respectively, and when the decoding operation of these data is completed, the process goes to a step S104 to end the reproducing operation.

As described above, the processing shown in FIG. 24 is carried out in parallel to the operation which is carried out from the reproduction start address to the reproduction end address.

First, at a step S111, when detecting DTSV on the basis of data supplied from the video code buffer 6 to the video decoder 7, the DTSV extraction circuit 51 outputs the DTSV to the control circuit 28. When the video decoder 7 decodes the video data supplied from the video code buffer 6 through the DTSV extraction circuit 51, the video decoder 7 supplies a picture decode signal to the control circuit 28 every time it decodes the data of one picture (decode unit). The control circuit 28 counts the number of picture decode signals supplied from the video decoder 7 at a step S112 (of course, the number of decode units of audio data may be counted).

Thereafter, at a step S113, the control circuit 28 calculates an expected value DTSVS of DTSV as follows:

$$DTSVS=DTSV+\text{picture period}\times\text{number of picture decode signals}=DTSV+(1/29.97\ Hz)\times 90\ kHz\times P$$

Here, 29.97 Hz corresponds to a time of one frame in the NTSC system, and P represents the number of the picture decode signals.

It may be adopted that the control circuit 28 receives no picture decode signal, and counts the time from the final DTSV to calculate DTSVS. That is, when detecting DTSV, the control circuit 28 counts a lapse time from a just-before DTSV, and sets the sum of the final DTSV and the lapse time as DTSVS in accordance with the following equation:

DTSVS=(just-before DTSV)+lapse time

Thereafter, the process goes to a step S114 to compare a newly detected DTSV with the expected value DTSVS of the DTSV. If the difference between the DTSV and the expected value is in a predetermined range of reference value, the data are judged to be continuous, and the process returns to the step S111 to repetitively execute the subsequent processing.

If the difference between the DTSV and the expected value DTSVS is beyond the reference value range at the step S114, the discontinuous point of the data can be judged to be detected. Accordingly, in this case, the process goes to a step S115 to perform the buffer-fullness adjustment, and then returns to the step S111.

Figure 25:
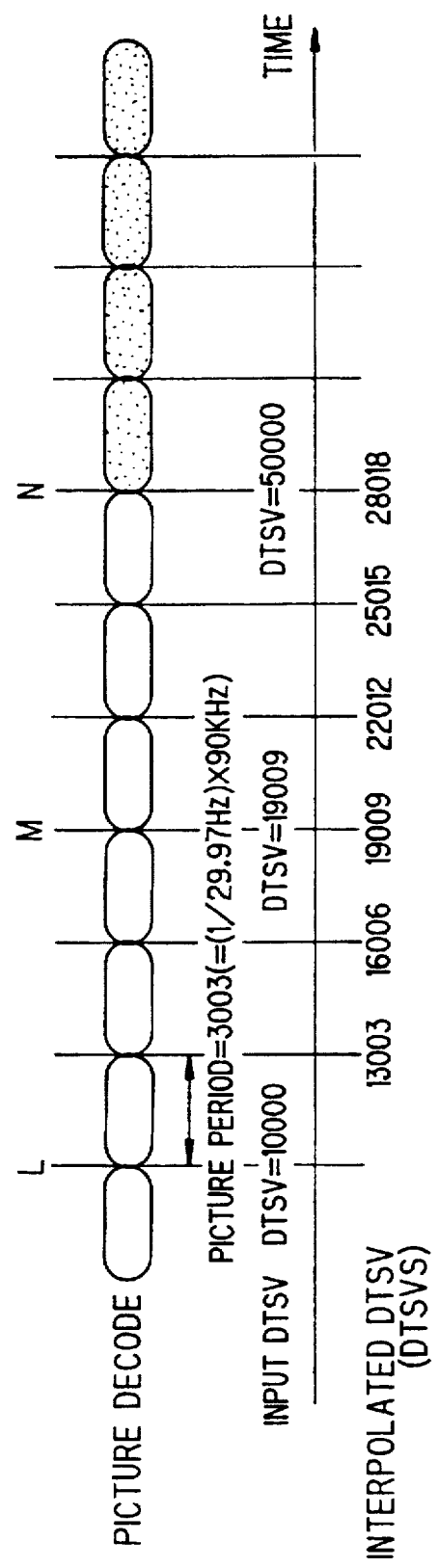
FIG. 25 is a timing chart showing the operation of the embodiment of FIG. 21.

FIG. 25 shows the relationship between the input DTSV and the expected value DTSVS. In the video decoder 7, pictures are successively decoded as represented by elliptical pits. It is assumed that DTSVs are detected at timings represented by L, M and N in FIG. 25.

The control circuit 28 detects DTSV=10000 from the DTSV extraction circuit 51 at the point L. The decode time (picture period) per picture is 3003 (=(1/29.97 Hz)×90 kHz) in the NTSC system, and thus the expected value DTSVS is varied like 13003, 16006, 19009, . . . . . Since the DTSV detected at the point M is 19009, it is equal to the expected value. On the other hand, since the DTSV detected at the point N is 50000, it is greatly different from the expected value 28018 at that point. Accordingly, the data are judged to be discontinuously varied at this point.

Figure 21:
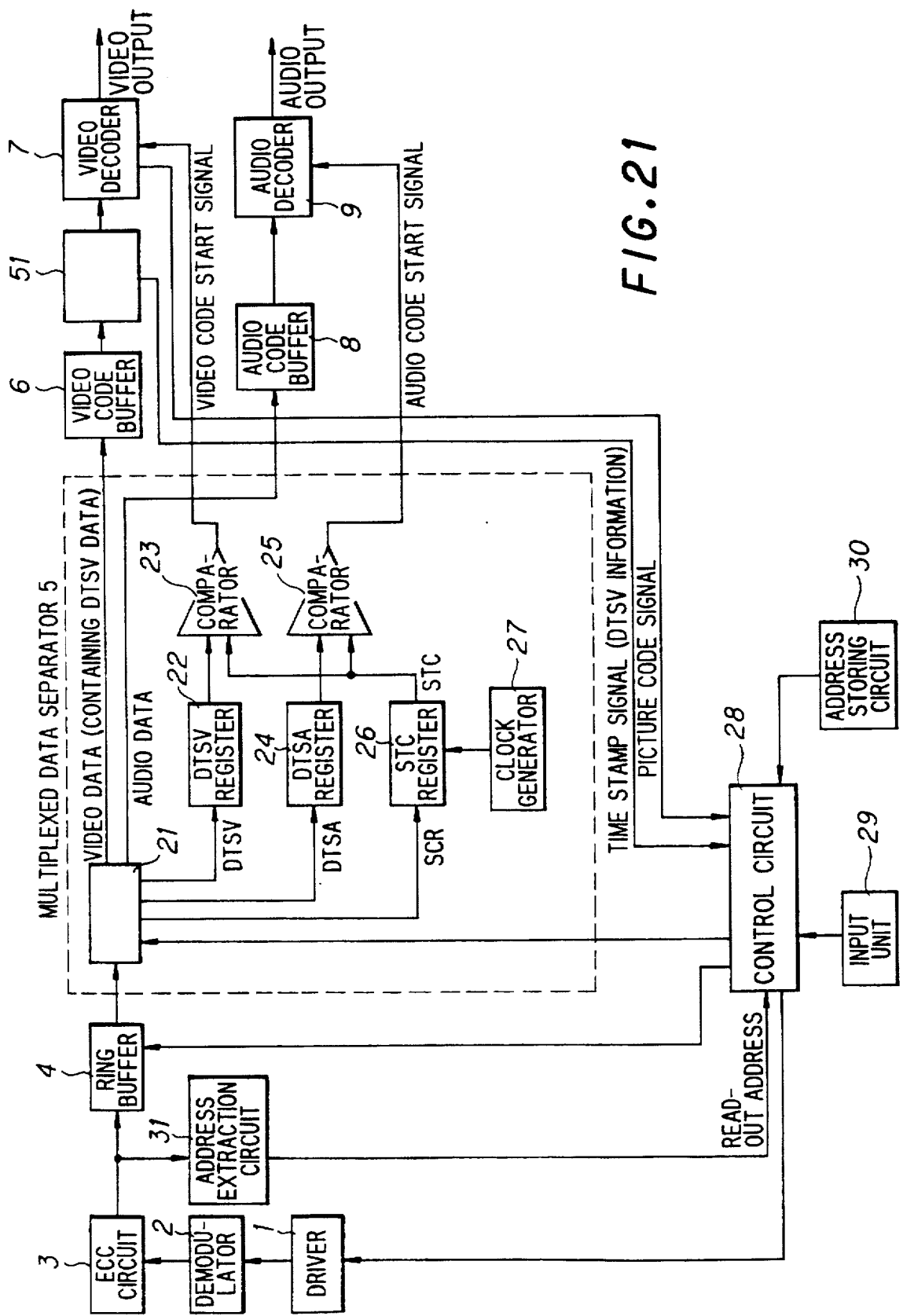
FIG. 21 is a block diagram showing the construction of another embodiment of the data reproducing device according to this invention.

In the embodiment shown in FIG. 21, the discontinuous point of the DTSV is detected as described above, and it is set as a discontinuous point of the data. Just before the discontinuous point of the data is input to the video decoder 7, the buffer-fullness of the video code buffer 6 is checked to its data amount, whereby the treatment for the discontinuous point can be rapidly performed.

In the above embodiment, DTS is used as time information, however, a time code or temporal reference which is defined in the MPEG1 video may be used at the time information.

Figure 26:
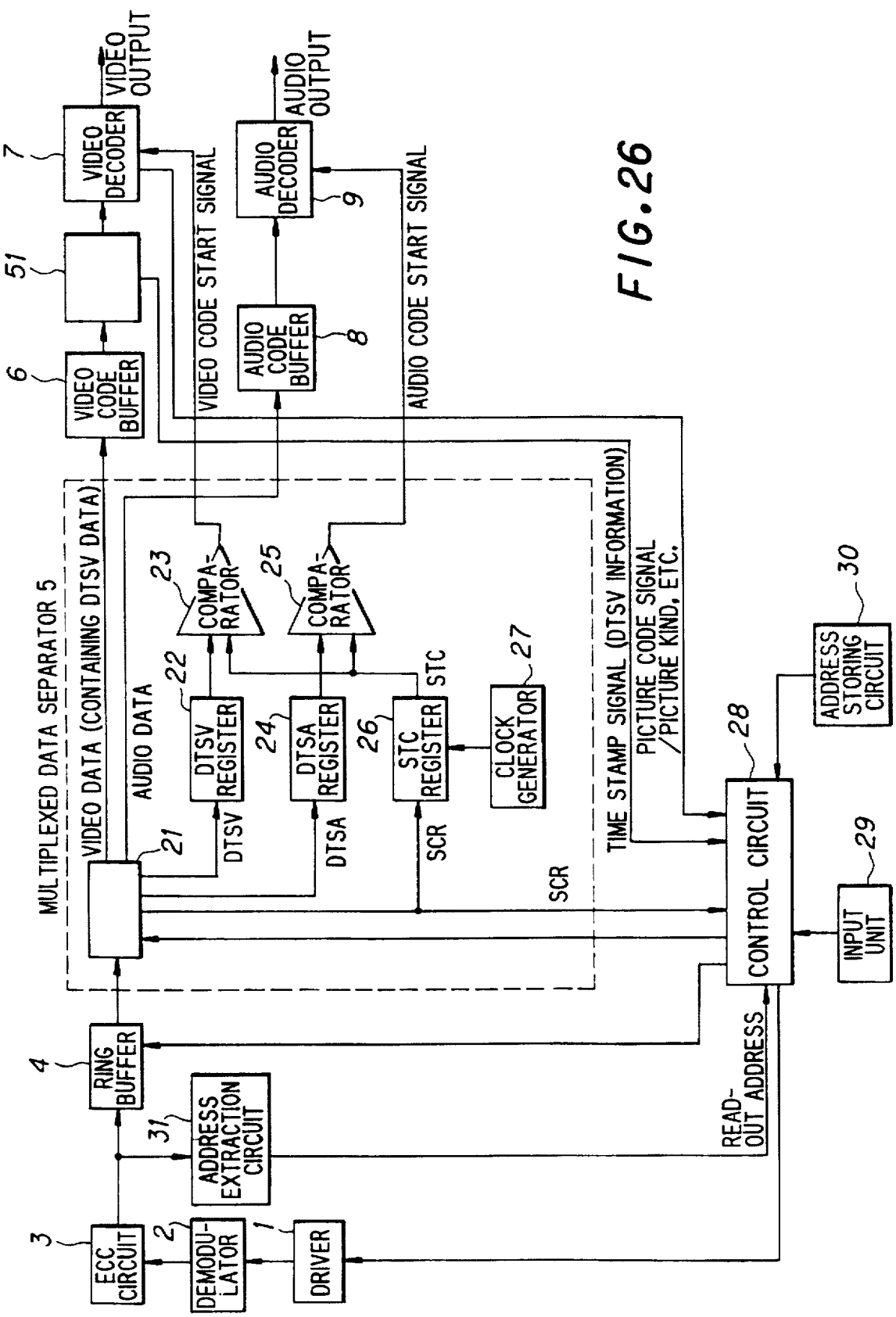
FIG. 26 is a block diagram showing the construction of another embodiment of the data reproducing device according to this invention.

FIG. 26 shows a fourth embodiment of the data reproducing device according to this invention. In this embodiment, the video decoder 7 outputs a picture decode signal to the control circuit 28 together with a signal representing the kind of a picture such as I-picture, B-picture or P-picture every time it decodes the data of one picture. Further, SCR which is separated and output by the data separation circuit 21 is supplied to the STC register 26, and also supplied to the control circuit 28. The other construction is identical to that of FIG. 21.

Next, the operation of the data reproducing device will be described with reference to the flowcharts of FIGS. 27 and 31. In this embodiment, the same processing at the steps S91 to S104 of FIGS. 22 and 23 is carried out at steps S121 to S134. That is, through the processing at the steps S121 to S134, the data till the point G and the data from the point H are continuously written into the ring buffer 4. Thereafter, the data stored in the ring buffer 4 are separated in the data separation circuit 21, and supplied to each circuit. The reproducing operation is continued until the reproduction end address is detected, and the reproducing operation is ended when the reproducing end address is detected.

Figure 27:
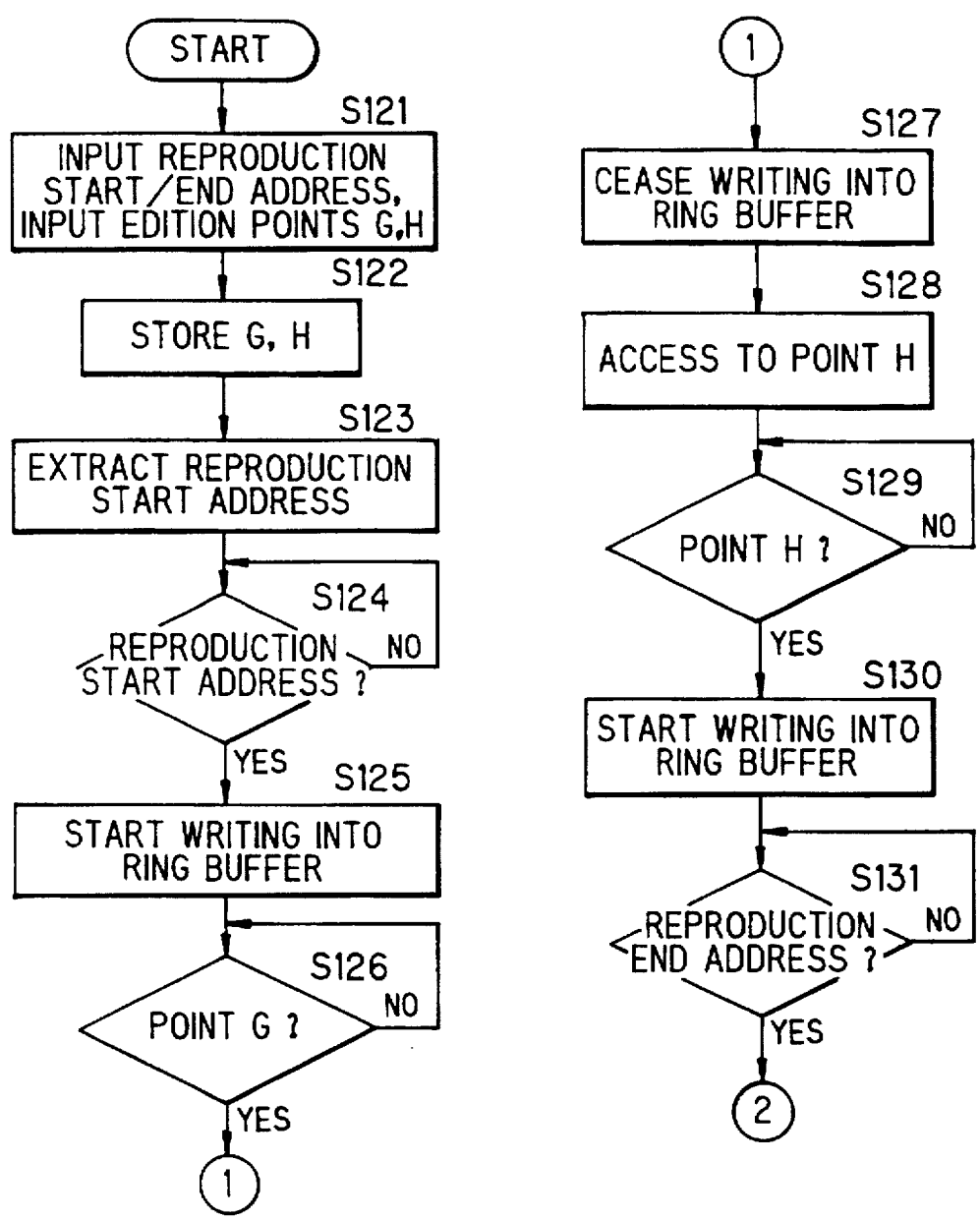
FIG. 27 is a flowchart showing the operation of the embodiment of FIG. 26.
Figure 28:
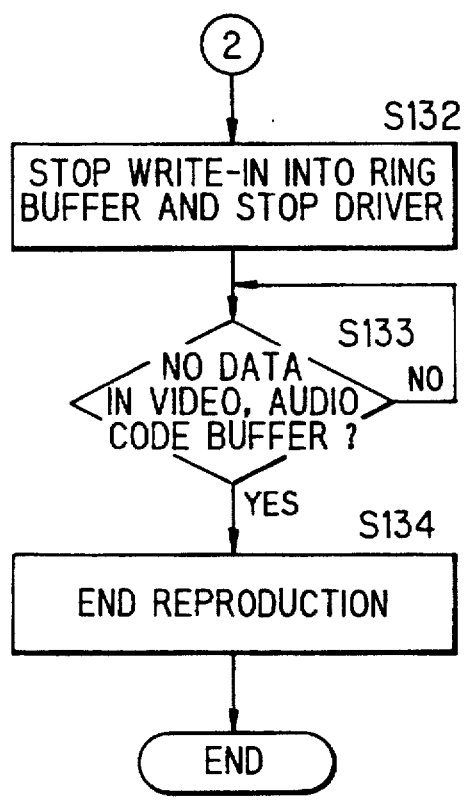
FIG. 28 is a flowchart subsequent to the flowchart of FIG. 27.
Figure 29:
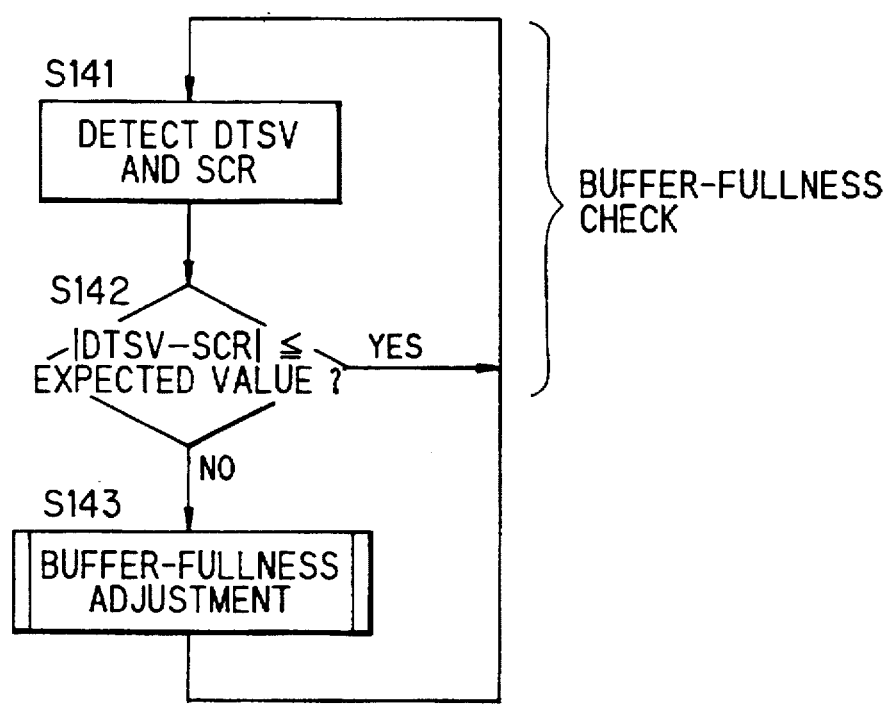
FIG. 29 is a flowchart showing the operation of the embodiment of FIG. 26.

As described above, in parallel to the processing shown in FIGS. 27 and 28, the processing shown in FIG. 29 is executed. First, at a step S141, the control circuit 28 detects the DTSV which is extracted from the data supplied from the video code buffer 6 to the video decoder 7 by the DTSV extraction circuit 51. Further, the control circuit 28 detects the SCR which is separated by the data separation circuit 21. Thereafter, the process goes to a step S142 to compare the DTSV and the SCR detected at the step S141 and judge whether the data storage amount of the video code buffer 6 is proper or not.

When the difference between the DTSV and the SCR exceeds a predetermined reference value, it is judged that the data storage amount (buffer-fullness) of the video code buffer 6 should be adjusted, and the process goes to a step S143 to execute the buffer-fullness adjustment processing. On the other hand, if the difference between the DTSV and the SCR is within the predetermined reference value, the data storage amount of the video code buffer 6 is judged to be proper, and thus the buffer-fullness adjustment processing is skipped.

In this embodiment, the treatment can be rapidly performed for even a case where any error occurs at the data supply side and the data supply to the video code buffer 6 is delayed. For example, in a case where vibration (external disturbance) is applied to the driver 1 in the reproducing operation and any correction-impossible error for the reproduction data occurs in the ECC circuit 3, the control circuit 28 instructs the driver 1 to reproduce the same portion again. When the re-reproduction of the same portion is instructed as described above, the pickup is jumped to a prescribed position, and the data of the prescribed position are reproduced again. At this time, the supply (write-in) of the reproduced data to the ring buffer 4 is temporarily intercepted, however, the decoding operation in the video decoder 7 is continued without being intercepted. As a result, the data accumulation amount of the video code buffer 6 is reduced.

Thereafter, the reproduction of the data from the driver 1 is re-started and the data supply to the video code buffer 6 is re-started. However, just after that time, only a relatively small amount of data are accumulated in the video code buffer 6.

In such a case, there becomes larger the difference between the DTSV (its value is large) of the data which are read out from the video code buffer 6, supplied to the video decoder 7 and decoded and the SCR (its value is small) which is separated by the data separation circuit 21 and is about to be supplied to the video code buffer 6. Accordingly, in this case, the data mount of the data stored in the video code buffer 6 is reduced, and thus the data amount is increased to its optimum value by the buffer-fullness adjustment.

The judgment processing at the step S142 of FIG. 29 is used to judge whether the DTSV is smaller than the SCR in a case where the buffer-fullness adjustment at the step S143 is carried out in a max rate full buffer system. If the DTSV is smaller than the SCR, the buffer-fullness of the video code buffer 6 can be judged to be proper.

Figure 30:
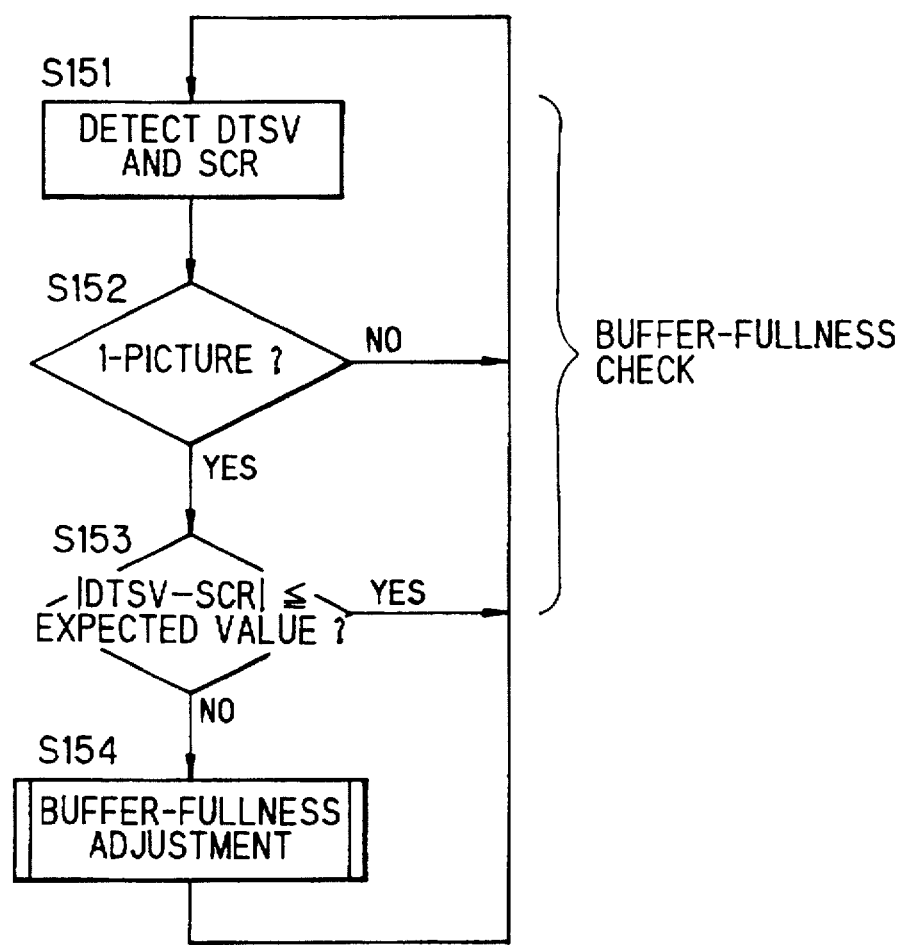
FIG. 30 is a flowchart showing the operation of the embodiment of FIG. 26.
Figure 31:
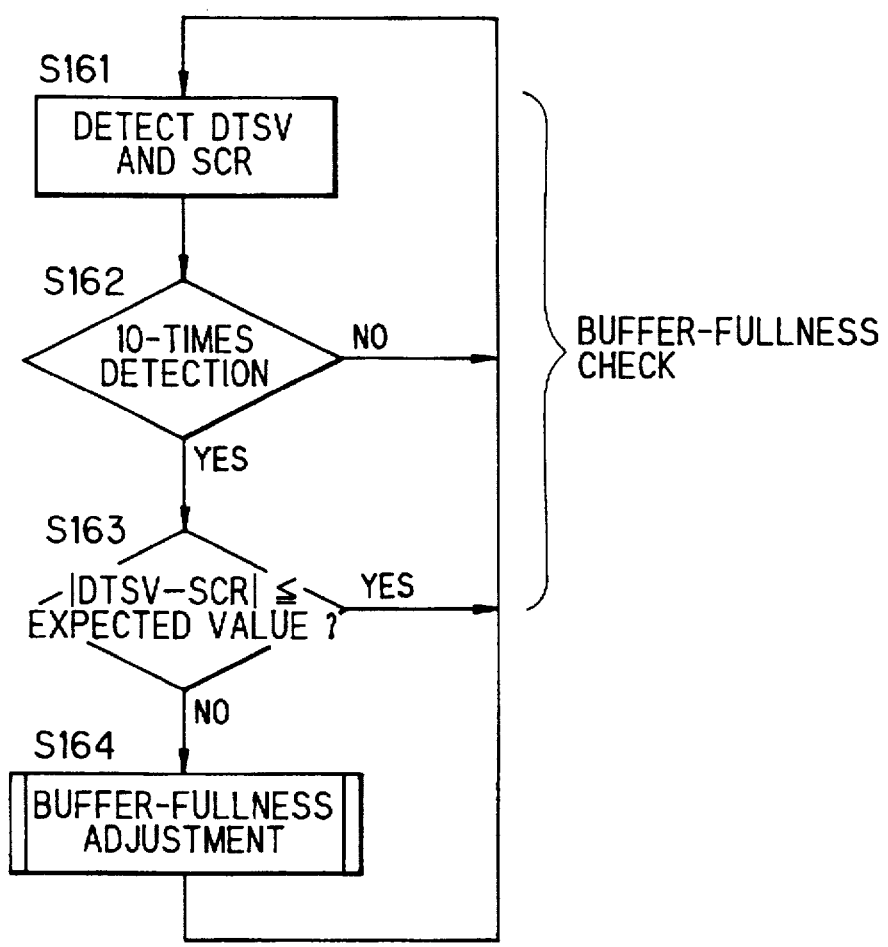
FIG. 31 is a flowchart showing the operation of the embodiment of FIG. 26.

In this embodiment, in place of the processing shown in FIG. 29, the processing shown in FIG. 30 or 31 may be executed.

In the embodiment shown in FIG. 30, at a step S151, the DTSV extracted by the DTSV extraction circuit 51 is detected. Further, on the basis of the picture kind signal supplied from the video decoder 7, the control circuit 28 judges whether a picture decoded by the video decoder 7 is an I-picture.

When the picture is judged to be the I-picture, the process goes to a step S153 to judge whether the difference between the DTSV and the SCR is within the reference value range. If the difference is beyond the reference value range, the process goes to a step S154 to execute the buffer-fullness adjustment processing. If it is judged at the step S152 that a P-picture or B-picture other than the I-picture is decoded and it is judged at the step S153 that the difference between the DTSV and the SCR is within the reference value range, no buffer-fullness adjustment processing is executed, and the process returns to the step S151.

That is, in this embodiment, when the DTSV is detected and the decoded picture is the I-picture, the buffer-fullness adjustment is carried out. In the MPEG system, the I-picture is inserted at a constant period (one for one group of picture). Accordingly, in this embodiment, the buffer-fullness adjustment is carried out at a predetermined period.

In the embodiment shown in FIG. 31, the same processing at the steps S151 to S154 of FIG. 30 is basically carried out at steps S161 to S164. However, the judgment processing at the step S162 is different from that at the step S152. That is, it is judged at the step S152 that the picture is the I-picture. However, at the step S162, it is judged whether the detection of the DTSV is performed at ten times. The other processing is identical to that of FIG. 30.

Accordingly, in this embodiment, the buffer-fullness adjustment is carried out every time the DTSV is detected at 10 times.

As described above, in the embodiments shown in FIGS. 26 to 31, the buffer-fullness adjustment is periodically carried out irrespective of the edition point like the embodiments shown in FIG. 21 to 25. Therefore, the operation can be carried out at the data consumption side, that is, at the side of the video decoder 7 and the audio decoder 9 without paying attention to the edition point, so that the system can be implemented in low cost. Further, even when any trouble occurs at the data supply side to induce interception of the data supply, the data lack period can be shortened.

Next, embodiments of the buffer-fullness adjustment processing as shown at the step S45 of FIG. 17, at the step S75 of FIG. 20, at the step S115 of FIG. 24, at the step S143 of FIG. 29, at the step S154 of FIG. 30, and at the step S164 of FIG. 31 will be described.

Figure 32:
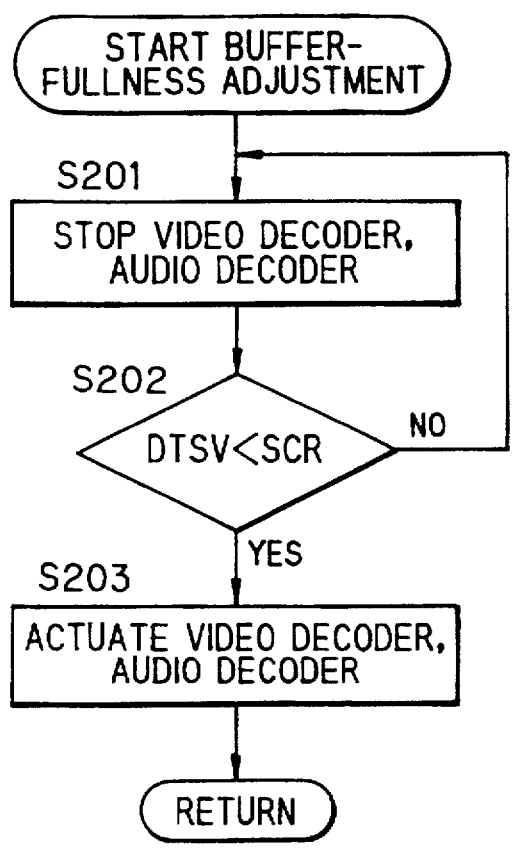
FIG. 32 is a flowchart showing a buffer-fullness adjustment processing.
Figure 33:
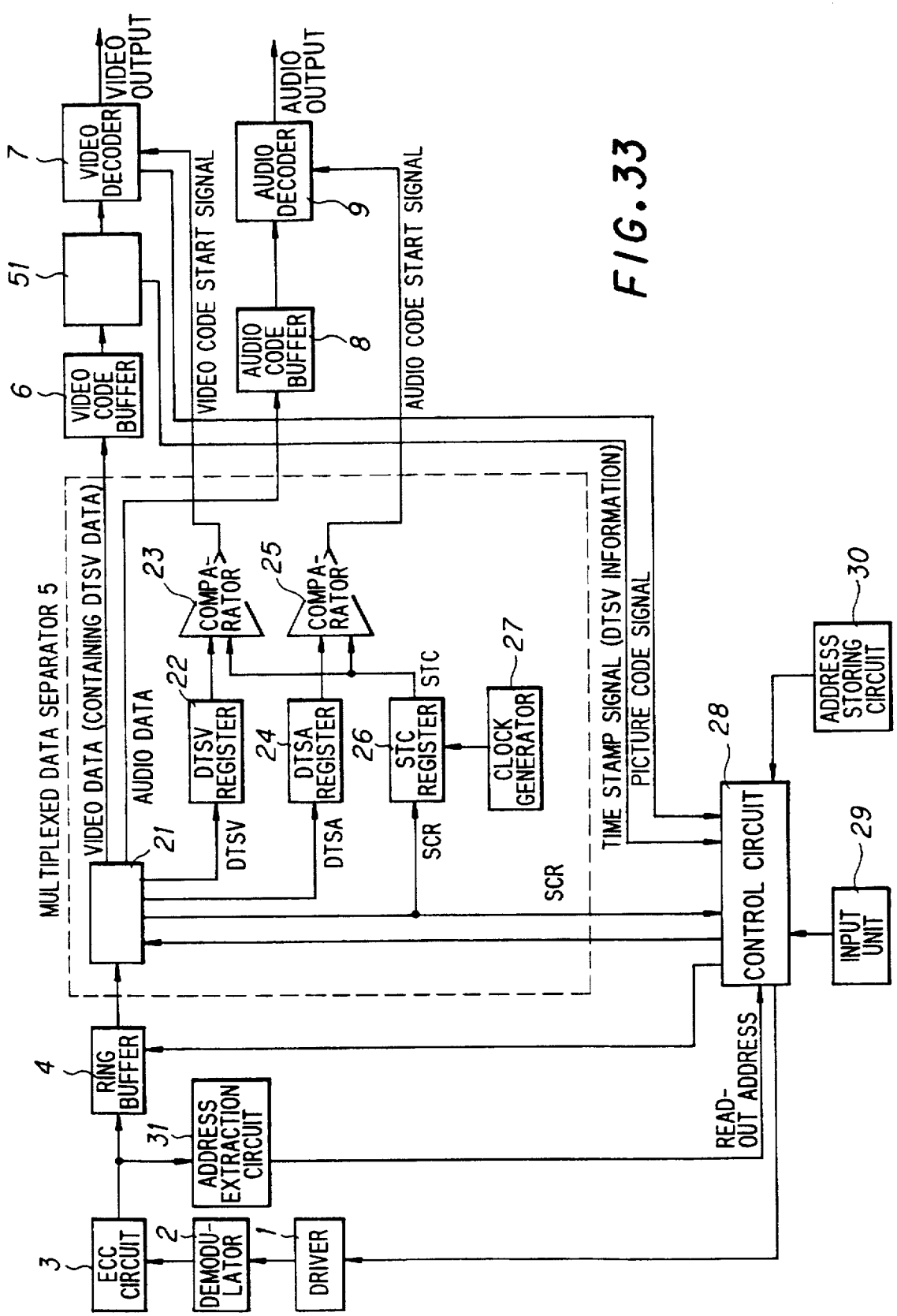
FIG. 33 is a block diagram showing the construction of the data reproducing device which executes the processing shown in FIG. 32.

FIG. 32 shows a first embodiment of the buffer-fullness adjustment processing. When the buffer-fullness adjustment processing is carried out in the embodiment shown in FIG. 21 for example, the SCR signal which is separated and output by the data separation circuit 21 is supplied to the control circuit 28 as shown in FIG. 33.

When the buffer-fullness adjustment processing as described above is carried out, for example, the discontinuity of the DTSV is detected at the step S114 of FIG. 24. Accordingly, the decoding operation of the video decoder 7 and the audio decoder 9 is first stopped at a step S201. Subsequently, the process goes to a step S202 to compare the DTSV extracted by the DTSV extraction circuit 51 and the SCR separated by the data separation circuit 21. If the DTSV is larger than the SCR, it is judged that a sufficient amount of data are not stored in the video code buffer 6 or audio code buffer 8, and the process returns to the step S201 at which the decoding operation of the video decoder 7 and the audio decoder 9 is left stopped.

If the SCR is judged to be larger than the DTSV at the step S202, it is judged that proper data are accumulated in the video code buffer 6 and the audio code buffer 8, and the process goes to a step S203 to restart the decoding operation of the video decoder 7 and the audio decoder 9.

Figure 34:
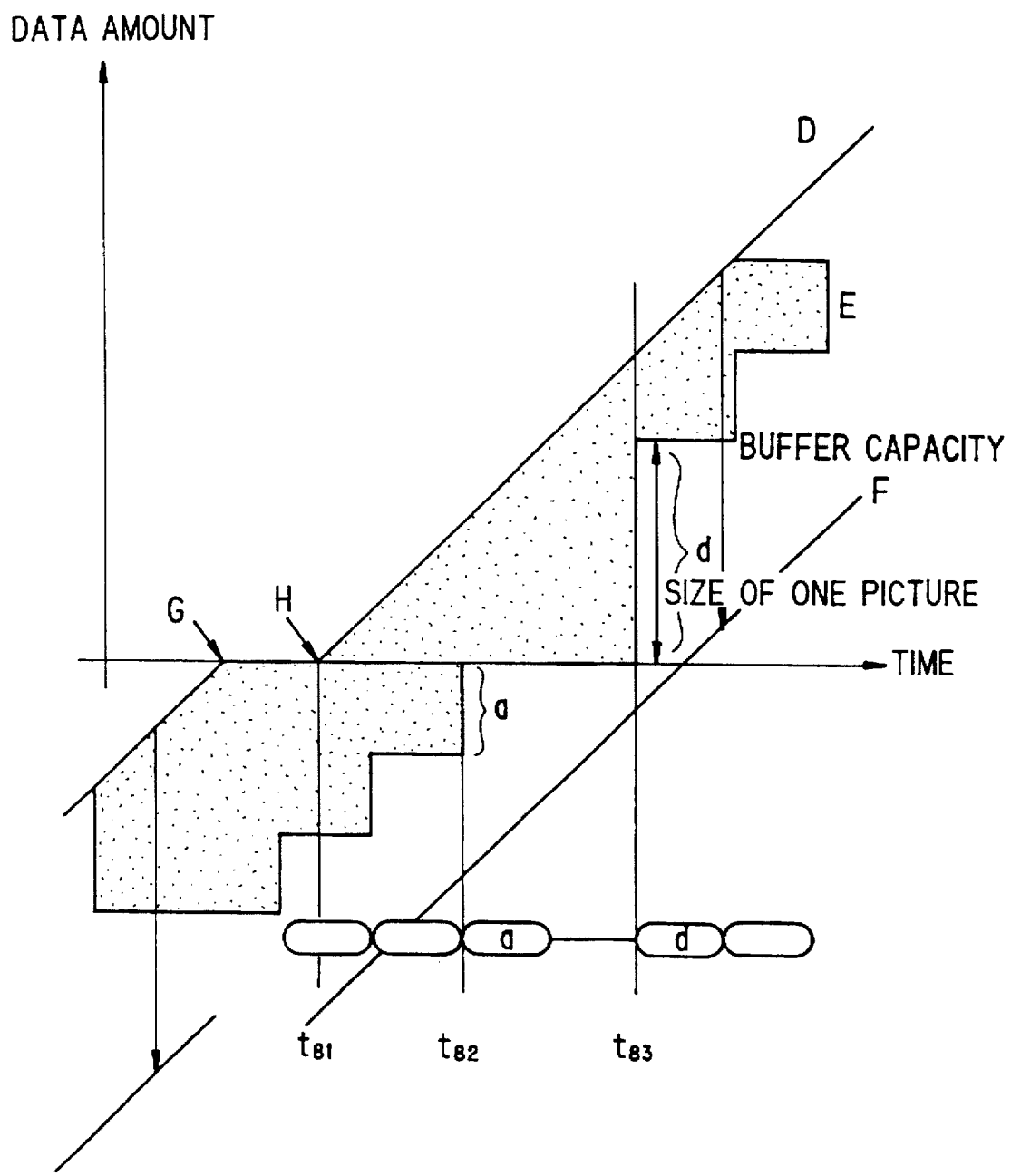
FIG. 34 is a timing chart showing the operation of the video code buffer 6 of FIG. 33.

The processing as described above will be described with reference to FIG. 34. It is assumed that the jump from the point G to the point H is carried out. At a time t81, the writing operation of the data subsequent to the point H into the video code buffer 6 is started. The DTSV of the picture d which is written into the video code buffer 6 as described above corresponds to a time t83 at which the decoding operation of the video decoder 7 is started.

On the other hand, the SCR corresponds to a timing at which the data input from the ring buffer 4 to the data separation circuit 21, that is, the video code buffer 6 is performed, so that the SCR representing the time corresponding to the input timing is smaller than the DTSV representing the decode start time. In this case, the control circuit 28 judges that sufficient data are not accumulated in the video code buffer 6, and inhibits the video decoder 7 from performing the decode operation.

When it is near to the time t83 or a time later than the time, the value of the SCR is equal to or larger the DTSV of the picture d. At this time, the control circuit 28 judges that the sufficient data are accumulated in the video code buffer 6, and restarts the decode operation of the video decoder 7.

Figure 35:
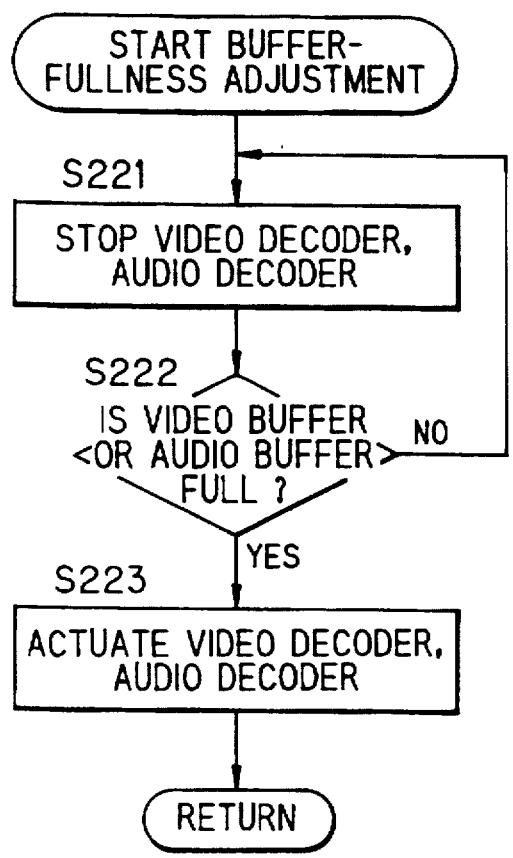
FIG. 35 is a flowchart showing another embodiment of the buffer-fullness adjustment processing.

FIG. 35 shows a second embodiment of the buffer-fullness adjustment processing. In order to realize this embodiment, for example, a buffer-fullness signal representing a data accumulation amount of the video code buffer is supplied to the control circuit 28 shown in FIG. 36.

Thereafter, the decode operation of the video decoder 7 and the audio decoder 9 is stopped at a step S221. Subsequently, the process goes to a step S222 to judge whether the buffer-fullness signal of the video code buffer 6 or audio code buffer 8 represents a data full state (a state where data are fully stored at maximum). If the data full state is not judged, the process returns to the step S221 to leave the decode operation stopped. When at the step S222 the buffer-fullness signal output from the video code buffer 6 or the audio code buffer 8 indicates the data full state, the process goes to a step S223 to restart the decode operation which was stopped at the step S221.

Figure 36:
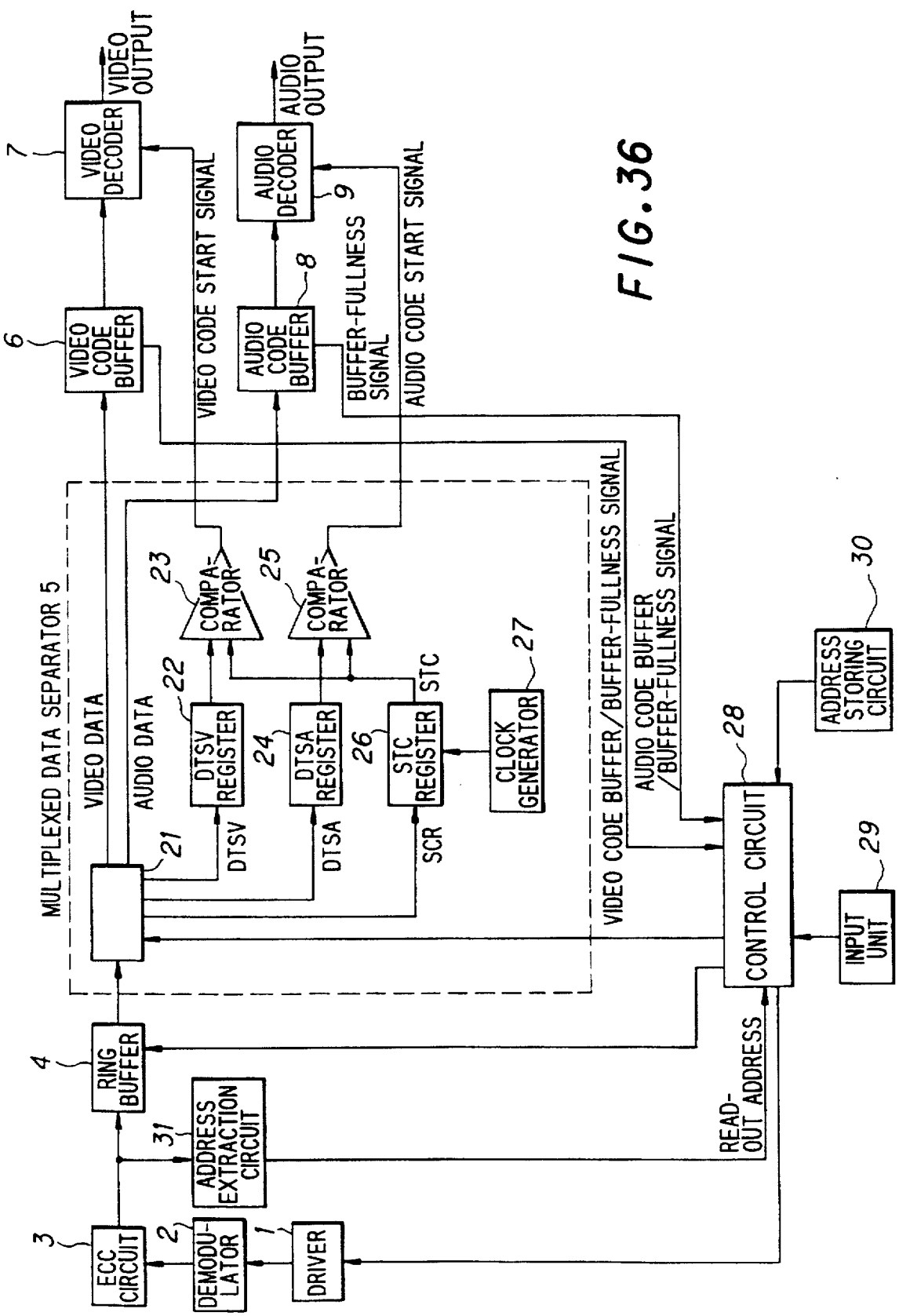
FIG. 36 is a block diagram of another embodiment of the data reproducing device according to this invention.

FIG. 36 shows a fifth embodiment of the data reproducing device according to this invention. In this embodiment, the buffer-fullness signal representing whether the video code buffer 6 and the audio code buffer 8 are in the overflow or underflow state is supplied from the video code buffer 6 and the audio code buffer 8 to the control circuit 28, respectively. The other construction is identical to that of FIG. 10.

Next, the operation of this embodiment will be described with reference to FIGS. 37 to 39. The same processing at the steps S91 to S104 of FIGS. 22 to 23 is carried out at steps S241 to S254 of FIGS. 37 to 38. That is, through the processing at the steps S241 to S254, the data till the point G before the jump is carried out and the data from the jump target point H are continuously written into the ring buffer 4. Thereafter, the reproducing operation is continued till the reproduction end address.

Figure 37:
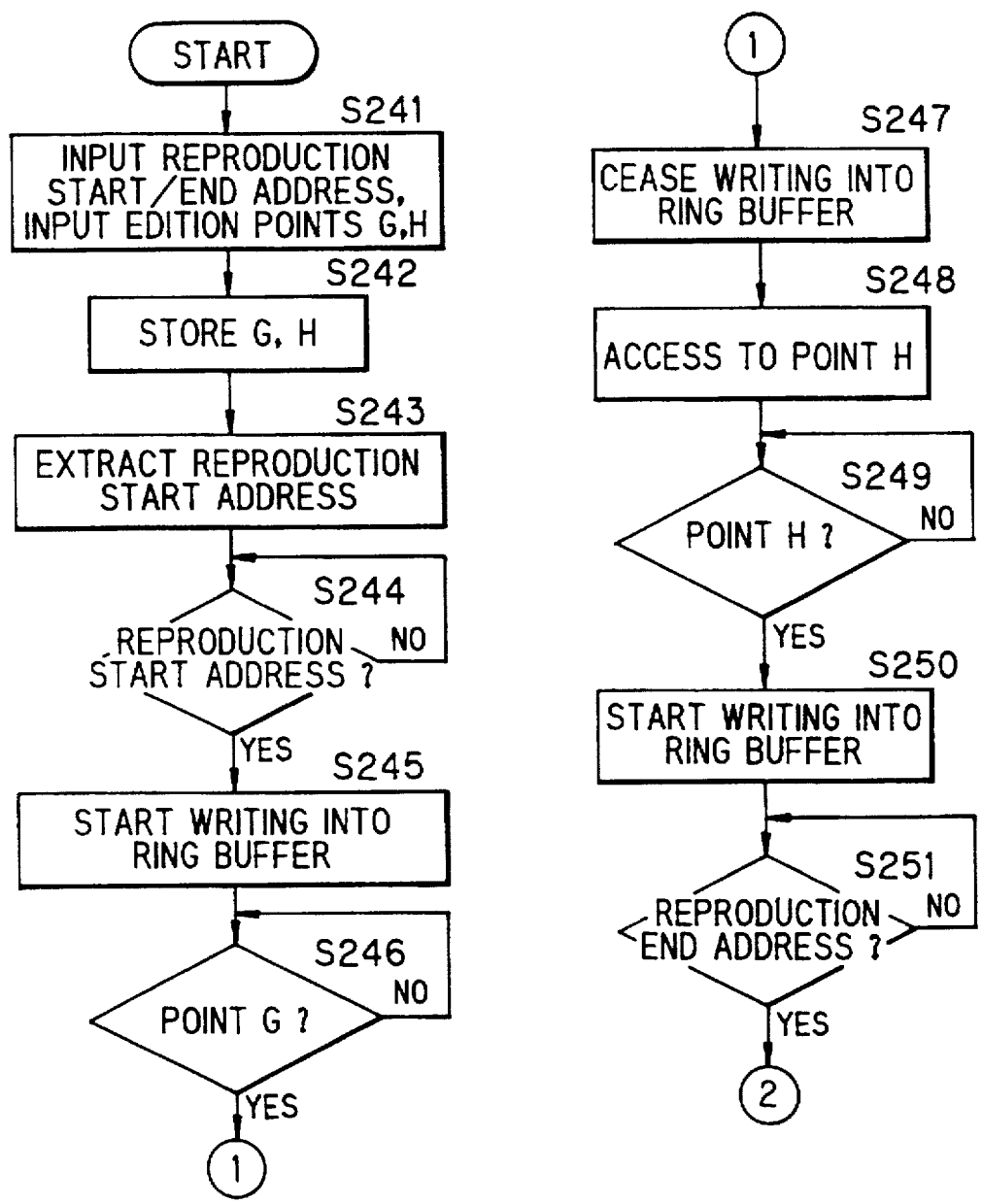
FIG. 37 is a flowchart showing the operation of the embodiment of FIG. 36.
Figure 38:
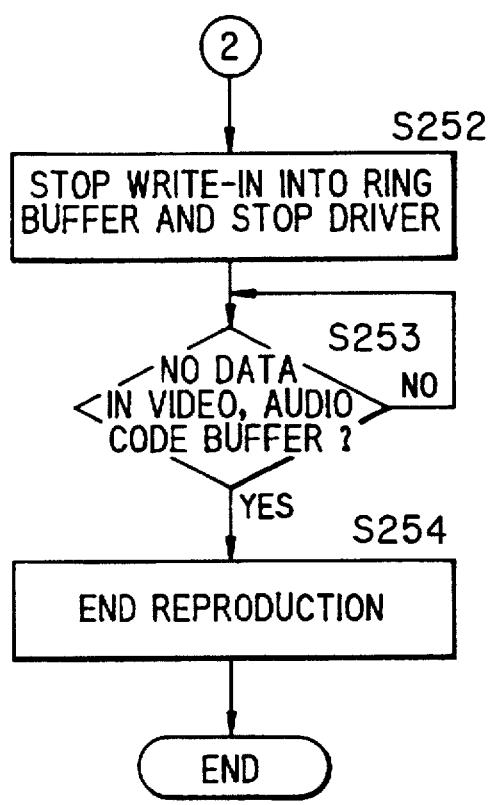
FIG. 38 is a flowchart subsequent to the flowchart of FIG. 37.
Figure 39:
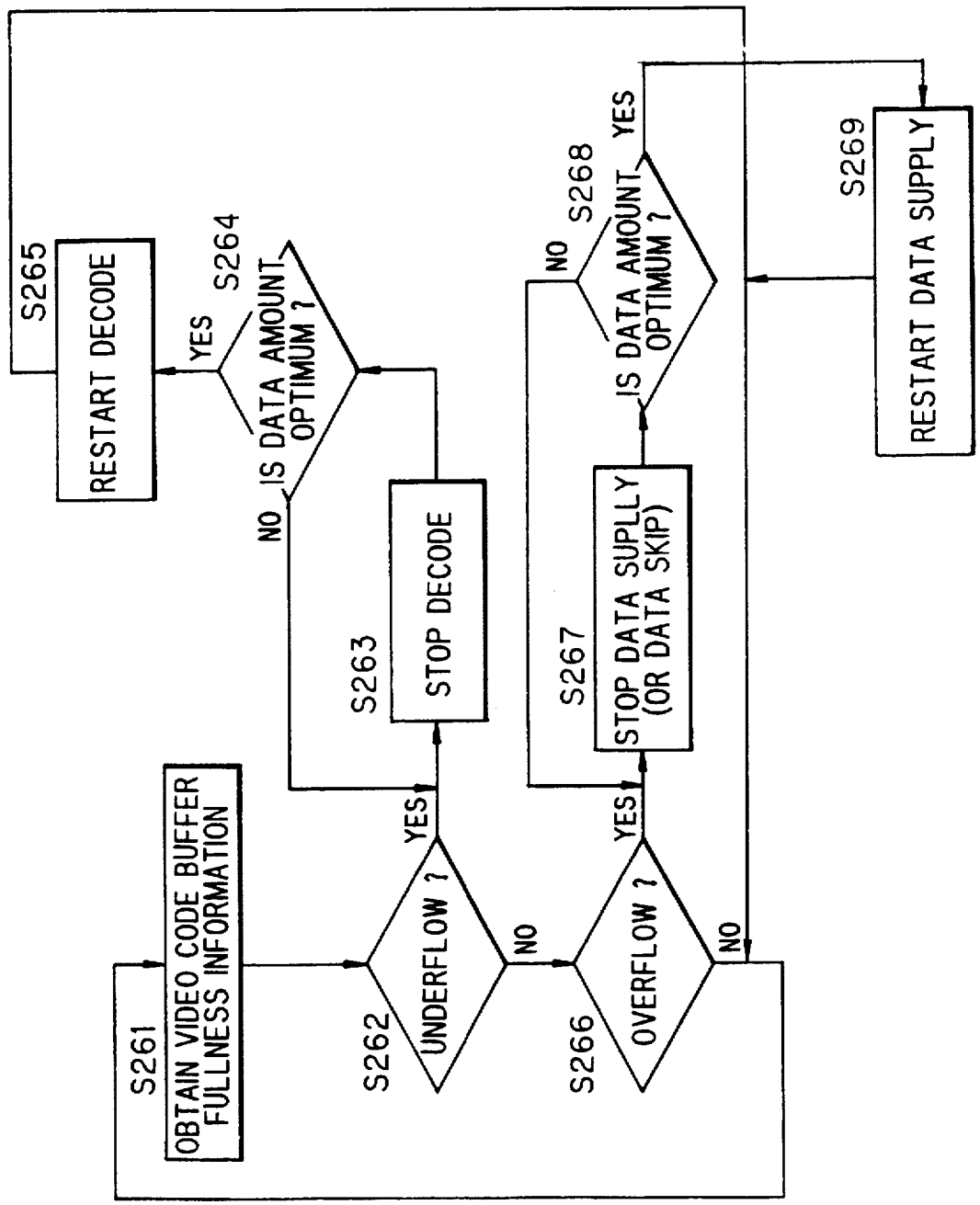
FIG. 39 is a flowchart showing the operation of the embodiment of FIG. 36.

In parallel to the processing of FIGS. 37 and 38, the processing of FIG. 39 is executed. In this processing, first, at a step S261 the control circuit 28 obtains buffer-fullness information from the video code buffer 6 and the audio code buffer 8. At steps S262 and S266, it is judged whether these buffers are in the underflow or overflow state.

If the underflow is judged at the step S262, the process goes to a step S263 to stop the decode processing of the video decoder 7 and the audio decoder 9. Thereafter, the process goes to a step S264 to monitor the buffer-fullness signals of the video code buffer 6 and the audio code buffer 8, and it waits until the data accumulation amount of the video code buffer 6 and the audio code buffer 8 is set to the optimum value. If the data accumulation amount reaches the optimum value, the process goes to a step S265 to restart the decode operation of the video decoder 7 and the audio decoder 9.

On the other hand, if the overflow is judged at the step S266, the process goes to a step S267 to control the ring buffer 4 to stop the data supply to the video code buffer 6. Since the decode operation of the video decoder 7 or audio decoder 9 is continued without being intercepted, the data accumulation amount of the video code buffer 6 or the audio code buffer 8 is gradually decreased. Accordingly, the process goes to a step S268 to wait until the data accumulation amount of the video code buffer 6 or audio code buffer 8 reaches the optimum value, and when the data accumulation amount reaches the optimum value, the process goes to a step S269 to restart the data supply from the ring buffer 4 again.

When the overflow is detected, in place of stopping the data supply to the video code buffer 6 or audio code buffer 8 at the step S267, the data to be decoded by the video decoder 7 or audio decoder 9 may be skipped.

When neither underflow nor overflow is detected at the steps S262 and S266, when the decode operation is restarted at the step S265 and when the data supply operation is restarted at the step S269, the process returns to the step S261 to repeat the processing as described above.

As described above, in this embodiment, the data mount in the video code buffer 6 and the audio code buffer 8 is monitored at all times, and when one of the buffers 6 and 8 is in the underflow or overflow state, the data accumulation amount of the buffer is adjusted, so that the data lack period of the reproduction data at the jump time can be shortened.

In the above embodiments as described above, the optical disc is reproduced by the driver 1 to obtain the reproduction data from the optical disc. However, this invention may be applied to a case where data re reproduced from a solid-state memory.

As described above, according to the data reproducing device of one aspect of this invention (claim 1), when the reproduction point of the reproducing means is discontinuously shifted, the write-in position of the first storing means (writing point) is stored in the second storing means. Further, when the reproduction point reaches a target point, the writing operation of the first storing means is restarted. When the read-out position of the first storing means (reading point) reaches the writing point stored in the second storing means, the read-out of the first storing means is stopped. Accordingly, the data lack period of the reproduction data can be more shortened as compared with the conventional data reproducing device.

According to the data reproducing device of another aspect of this invention (claim 5 or claim 6), the data reproduced by the reproducing means are supplied to the first storing means and decoded by the decode means. When the reproduction point of the data is discontinuously shifted, the write-in position of the first storing means (writing point) is stored in the second storing means. When the read-out position of the first storing means (reading point) becomes a value corresponding to the writing point stored in the second storing means, the decode operation of the decoding means is stopped, and the adjustment processing of the data storage amount of the first storing means is carried out. Accordingly, the data lack period can be more shortened as compared with the data reproducing device of one aspect (claim 1).

According to the data reproducing device of another aspect of this invention (claim 11 or 12), the time information of data to be decoded is detected by the time detection means. In accordance with the time information, the decode processing of the decode means or the data storage amount of the second storing means are controlled. Accordingly, not only the processing at the discontinuous point can be rapidly performed, but also the data lack period can be shortened even when any trouble occurs at the data supply side.

According to the data reproducing device of another aspect of this invention (claim 14 or 15), the time information is detected by the time detection means, and the discontinuity of the time information is detected. When the discontinuity is detected, the decode operation of the decode means is controlled and the data storage amount of the second storing means is adjusted. Accordingly, the processing at the discontinuous point can be rapidly performed.

According to the data reproducing device of another aspect of this invention (claim 17 or 18), the difference in the time information, for example, between the timing information such as SCR and the time information corresponding to the decode start time of the decode means such as DTSV is detected. In accordance with the difference, the decode operation of the decode means is controlled and the storage mount of the second storing means is adjusted. Accordingly, the processing at the discontinuous point can be rapidly performed.

According to the reproducing device of another aspect of this invention (claim 27 or 28), the discontinuous points of the data stored in the storing means are detected by the discontinuous point detection means. In accordance with the detection result, the decoding operation of the decode means or the data storage amount of the storing means is controlled. Accordingly, even when the reproduction point is discontinuously shifted and when any trouble occurs at the data supply side, the data lack period of the reproduction data can be shortened.

According to the data reproducing device of another aspect of this invention (claim 30), the data storage amount of the second storing means is detected, and in accordance with the detection result the decode operation of the decode means is controlled or the data storage amount of the second storing means is adjusted. Accordingly, the data lack period can be shortened even when the data reproduction point is discontinuously shifted.

What is claimed is:

1. Apparatus for reproducing data from a recording medium, said data containing time information, comprising:

reproducing means for reproducing the data containing time information from said recording medium to provide reproduced data;

first storing means for storing the reproduced data;

reading means for reading the stored data from said first storing means;

decode means for decoding the data read from said first storing means;

time detection means for detecting the time information from the reproduced data to provide first detected time information;

decode control means for controlling said decode means to selectively start or inhibit the decoding of data read from said first storing means in accordance with the first detected time information;

second storing means for storing the reproduced data; and separating means for separating the data read from said second storing means into a plurality of data;

wherein said reading means is additionally operable to read data from said second storing means; and wherein said first storing means is operable to store said plurality of data from said separating means.

2. Apparatus for reproducing data from a recording medium, said data containing time information, comprising:

reproducing means for reproducing the data containing time information from said recording medium to provide reproduced data;

first storing means for storing the reproduced data;

reading means for reading the stored data from said first storing means;

separating means for separating the data read from said first storing means into a plurality of data;

second storing means for storing the said plurality of data from said separating means;

decode means for decoding the data read from said second storing means;

time detection means for detecting the time information from the reproduced data to provide first detected time information;

decode control means for controlling said decode means to selectively start or inhibit the decoding of data read from said second storing means in accordance with the first detected time information;

location detection means for detecting a non-successive location representing the location on said recording medium where the reproduced data is not successively located, a discontinuous position representing the position on said recording medium where the reproduced data temporarily discontinues and then continues in a non-adjacent position, and a restart position representing the position on said recording medium where the reproduced data continues in said non-adjacent position;

third storing means for storing a first position representing the position in said second storing means at which the reproduced data from said non-successive location is stored;

write control means for controlling said second storing means whereby said second storing means is inhibited from storing the reproduced data when it is determined that the reproduced data is from said discontinuous position and said second storing means is permitted to restart storing of the reproduced data when it is determined that the reproduced data is from said restart position; and detection control means for controlling said time detection means to selectively start or inhibit detecting the time information from the reproduced data in accordance with said first position stored in said third storing means to minimize the time the reproduced data is unavailable for decoding.

3. The apparatus of claim 2, further comprising storage detection means for detecting a quantity of data in said second storing means; and wherein said decoding means is operable to inhibit decoding of the data read from said second storing means when it is determined that the reproduced data is from said non-successive location and to restart decoding when said storage detection means detects a predetermined quantity of data in said second storing means.

4. An apparatus for reproducing data from a recording medium, said data containing time information, comprising:

reproducing means for reproducing data containing time information from said recording medium to provide reproduced data;

first storing means for storing the reproduced data;

reading means for reading the stored data from said first storing means;

decode means for decoding the data read from said first storing means to provide a plurality of decode units, wherein each of said plurality of decode units represents one picture;

time detection means for detecting the time information from the reproduced data to provide detected time information;

discontinuous detection means for detecting a discontinuity in said detected time information to provide discontinuous time information;

decode control means for controlling said decode means to selectively start or inhibit the decoding of data read from said first storing means in accordance with said discontinuous time information to minimize the time the reproduced data is unavailable for reading;

storage control means for controlling a quantity of data in said first storing means in accordance with said discontinuous time information;

counting means for counting the number of decode units decoded by said decode means; and calculating means for calculating an expected time information as a function of said detected time information and the number of decode units counted by said counting means.

5. The apparatus of claim 4, further comprising comparing means for comparing said detected time information to said expected time information to determine if said detected time information is within a predetermined range of said expected time information; wherein said storage control means is operable to selectively start or inhibit the reading of data from said first storing means to control the quantity of data in said first storing means; and wherein said decode control means is operable to control said decoding means to inhibit the decoding of data read from said first storing means and said storage control means is operable to inhibit the reading of data from said first storing means when it is determined that said detected time information is within the predetermined range of said expected time information.

6. The apparatus of claim 5, further comprising storage detection means for detecting the quantity of data in said first storing means; and wherein said decode control means is operable to control said decoding means to start decoding when said storage detection means detects a predetermined quantity of data in said first storing means.

7. An apparatus for reproducing data from a recording medium, said data containing time information, comprising:

reproducing means for reproducing data containing time information from said recording medium to provide reproduced data;

first storing means for storing the reproduced data;

reading means for reading the stored data from said first storing means;

decode means for decoding the data read from said first storing means to provide a plurality of decode units, wherein each of said plurality of decode units represents one picture;

time detection means for detecting the time information from the reproduced data to provide detected time information;

discontinuous detection means for detecting a discontinuity in said detected time information to provide discontinuous time information;

decode control means for controlling said decode means to selectively start or inhibit the decoding of data read from said first storing means in accordance with said discontinuous time information to minimize the time the reproduced data is unavailable for reading;

storage control means for controlling a quantity of data in said first storing means in accordance with said discontinuous time information; and comparing means for comparing said detected time information to said discontinuous time information; wherein said storage control means is operable to selectively start or inhibit the reading of data from said first storing means to control the quantity of data in said first storing means; and wherein said decode control means is operable to control said decoding means to inhibit the decoding of data read from said first storing means and said storage control means is operable to inhibit the reading of data from said first storing means when it is determined that said detected time information does not correspond to said discontinuous time information.

8. The apparatus of claim 7, wherein the reproduced data is MPEG data; wherein said detected time information is a system clock reference (SCR); and wherein said discontinuous time information is a decoding time stamp for video data (DTSV).

9. The apparatus of claim 7, further comprising storage detection means for detecting the quantity of data in said first storing means; and wherein said decode control means is operable to control said decoding means to start decoding when said storage detection means detects a predetermined quantity of data in said first storing means.

10. An apparatus for reproducing data from a recording medium, said data containing time information, comprising:

reproducing means for reproducing data containing time information from said recording medium to provide reproduced data;

first storing means for storing the reproduced data;

reading means for reading the stored data from said first storing means;

decode means for decoding the data read from said first storing means to provide a plurality of decode units, wherein each of said plurality of decode units represents one picture;

time detection means for detecting the time information from the reproduced data to provide detected time information;

discontinuous detection means for detecting a discontinuity in said detected time information to provide discontinuous time information;

decode control means for controlling said decode means to selectively start or inhibit the decoding of data read from said first storing means in accordance with said discontinuous time information to minimize the time the reproduced data is unavailable for reading;

storage control means for controlling a quantity of data in said first storing means in accordance with said discontinuous time information; and second storing means for storing the reproduced data and separation means for separating data read from said second storing means into a plurality of data; wherein said reading means is additionally operable to read data from said second storing means; and wherein said first storing means is operable to store said plurality of data from said separation means.

11. An apparatus for reproducing data from a recording medium, said data containing time information, comprising:

reproducing means for reproducing data containing time information from said recording medium to provide reproduced data;

first storing means for storing the reproduced data;

reading means for reading the stored data from said first storing means;

decode means for decoding the data read from said first storing means;

time detection means for detecting the time information from the reproduced data to provide detected time information;

discontinuous detection means for detecting a discontinuity in said detected time information to provide discontinuous time information;

comparing means for detecting a difference between said detected time information and said discontinuous time information to provide time difference information;

decode control means for controlling said decode means to selectively start or inhibit the decoding of data read from said first storing means in accordance with said time difference information to minimize the time the reproduced data is unavailable for reading;

storage control means for controlling a quantity of data in said first storing means in accordance with said time difference information; and wherein said reproduced data contains at least video data containing a plurality of types of pictures; wherein said decode means is additionally operable to decode said plurality of types of pictures; wherein said apparatus further comprises picture detection means for detecting the type of picture decoded by said decode means; and wherein said comparing means is operable to provide said time difference information when a predetermined type of picture is decoded by said decode means.

12. The apparatus of claim 11, wherein said predetermined type of picture is an I-picture.

13. An apparatus for reproducing data from a recording medium, said data containing time information, comprising:

reproducing means for reproducing data containing time information from said recording medium to provide reproduced data;

first storing means for storing the reproduced data;

reading means for reading the stored data from said first storing means;

decode means for decoding the data read from said first storing means;

time detection means for detecting the time information from the reproduced data to provide detected time information;

discontinuous detection means for detecting a discontinuity in said detected time information to provide discontinuous time information;

comparing means for detecting a difference between said detected time information and said discontinuous time information to provide time difference information;

decode control means for controlling said decode means to selectively start or inhibit the decoding of data read from said first storing means in accordance with said time difference information to minimize the time the reproduced data is unavailable for reading;

storage control means for controlling a quantity of data in said first storing means in accordance with said time difference information; and counting means for counting the number of times said detected time information is provided in a predetermined time interval; and wherein said comparing means is operable to provide said time difference information when a predetermined number of said detected time information is provided in said predetermined time interval.

14. The apparatus of claim 13, wherein said time detection means is operable to detect said discontinuous time information from the reproduced data; and wherein said counting means is operable to count the number of times said discontinuous time information is detected in said predetermined time interval by said time detection means.

15. The apparatus of claim 14, wherein said time detection means is operable to detect the time information from the data read from said first storing means.

16. The apparatus of claim 14, wherein said storage control means is operable to selectively start or inhibit the reading of data from said first storing means to control the quantity of data in said first storing means; wherein said comparing means is operable to determine if said detected time information precedes said discontinuous time information; and wherein said decode control means is operable to control said decoding means to inhibit the decoding of data read from said first storing means and said storage control means is operable to inhibit the reading of data from said first storing means when it is determined that said detected time information precedes said discontinuous time information.

17. The apparatus of claim 13, wherein the reproduced data is MPEG data; wherein said detected time information is a system clock reference (SCR); and wherein said discontinuous time information is a decoding time stamp for video data (DTSV).

18. The apparatus of claim 17, further comprising second storing means for storing the reproduced data and separation means for separating data read from said second storing means into a plurality of data; wherein said reading means is additionally operable to read data from said second storing means; and wherein said first storing means is operable to store said plurality of data from said separation means.

* * * * *